(12) United States Patent
Daruna et al.

(10) Patent No.: US 11,941,599 B2
(45) Date of Patent: Mar. 26, 2024

(54) MACHINE-LEARNING BASED ELECTRONIC ACTIVITY ACCURACY VERIFICATION AND DETECTION OF ANOMALOUS ATTRIBUTES AND METHODS THEREOF

(71) Applicant: Capital One Services, LLC, McLean, VA (US)

(72) Inventors: Srinivasarao Daruna, Ashburn, VA (US); Vijay Sahebgouda Bantanur, Gaithersburg, MD (US); Marisa Lee, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 444 days.

(21) Appl. No.: 17/139,220

(22) Filed: Dec. 31, 2020

(65) Prior Publication Data

US 2022/0207506 A1    Jun. 30, 2022

(51) Int. Cl.
*G06Q 20/20* (2012.01)
*G06N 20/00* (2019.01)
*G06Q 20/40* (2012.01)

(52) U.S. Cl.
CPC ............. *G06Q 20/20* (2013.01); *G06N 20/00* (2019.01); *G06Q 20/40* (2013.01); *G06Q 20/407* (2013.01)

(58) Field of Classification Search
CPC ...... G06Q 20/20; G06Q 20/40; G06Q 20/407; G06N 20/00
See application file for complete search history.

(56) References Cited

U.S. PATENT DOCUMENTS 8,805,737 B1   8/2014 Chen et al.
11,488,178 B2 * 11/2022 Zhai ...................... G06F 21/554
(Continued)

FOREIGN PATENT DOCUMENTS

AU   2015201865 A1 *  4/2015   ............. G06Q 20/04
GB      2597130 A   *  1/2022   ............. G06N 20/20

OTHER PUBLICATIONS

Leskovec, Jure, Anand Rajaraman, and Jeffrey David Ullman. "Mining of Massive Datasets." (2019). (Year: 2019).*

*Primary Examiner* — Scott C Anderson
*Assistant Examiner* — James H Miller
(74) *Attorney, Agent, or Firm* — Greenberg Traurig, LLP

(57) ABSTRACT

Systems and methods of the present disclosure enable a processor to automatically detect anomalous user-specified data by receiving an electronic activity verification associated with an electronic activity of a user account, including a value associated with an electronic activity, and a user-specified value indicative of an additional value specified by a user for the electronic activity. The processor generates a feature vector including the verified value and the user-specified value and utilizes an anomalous attribute classification model to ingest the feature vector to determine an anomaly classification based on learned model parameters. The processor generates a dispute graphical user interface (GUI) including an alert message and a dispute interface element, that upon a user interaction causes an electronic request to dispute the electronic activity verification to prevent an execution of the electronic activity. The processor cancels the electronic activity to prevent the execution of the electronic activity.

11 Claims, 9 Drawing Sheets

(56) References Cited

U.S. PATENT DOCUMENTS

| | | | |
|---|---|---|---|
| 11,575,693 B1* | 2/2023 | Muddu | G06F 40/134 |
| 2003/0233292 A1* | 12/2003 | Richey | G06Q 40/12 |
| | | | 705/28 |
| 2009/0099966 A1* | 4/2009 | Lee | G06Q 20/425 |
| | | | 705/35 |
| 2014/0279539 A1* | 9/2014 | Rephlo | G06Q 20/405 |
| | | | 705/44 |
| 2017/0063902 A1* | 3/2017 | Muddu | H04L 41/22 |
| 2018/0005203 A1* | 1/2018 | Grassadonia | G06Q 20/40 |
| 2018/0165775 A1* | 6/2018 | Bhattacharjee | G06Q 30/0202 |
| 2018/0181626 A1* | 6/2018 | Lyons | G06Q 30/0201 |
| 2018/0211292 A1* | 7/2018 | Fang | G06Q 30/04 |
| 2019/0139014 A1 | 5/2019 | Carlson et al. | |
| 2019/0385168 A1* | 12/2019 | Jamkhedkar | G06Q 50/182 |
| 2020/0134627 A1* | 4/2020 | Hamooni | G06Q 20/0855 |
| 2020/0167785 A1* | 5/2020 | Kursun | H04L 43/045 |
| 2021/0192641 A1* | 6/2021 | Das | G06F 16/2365 |
| 2021/0288983 A1* | 9/2021 | Tambuluri | G06F 21/6209 |
| 2021/0383391 A1* | 12/2021 | Barry | H04L 67/306 |
| 2021/0398142 A1* | 12/2021 | Kubler | G06Q 20/407 |
| 2022/0114593 A1* | 4/2022 | Johnson | G06F 18/24133 |
| 2022/0114594 A1* | 4/2022 | Nunes | G06Q 20/4016 |
| 2022/0164699 A1* | 5/2022 | Neupane | G06Q 20/405 |
| 2022/0237518 A1* | 7/2022 | Jain | G06Q 30/0201 |
| 2023/0013949 A1* | 1/2023 | Vijayaraghavan | |
| | | | G06Q 20/4016 |

* cited by examiner

MACHINE-LEARNING BASED ELECTRONIC ACTIVITY ACCURACY VERIFICATION AND DETECTION OF ANOMALOUS ATTRIBUTES AND METHODS THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured for machine-learning based electronic activity accuracy verification and detection of anomalous attributes and methods thereof.

BACKGROUND OF TECHNOLOGY

Many electronic activities include data or values specified by a user. In some circumstances, the data or values specified by a user may be a target for malicious behavior, such as fraud. In many circumstances, the data or values specified by a user may simply have the potential for user error. However, because such data and values are user-specified, there are no sources of truth or authority for the correct data or the correct value. Thus, detecting and remedying these errors without the user's input is technological problem without a solution for how to determine the correct data or the correct value.

SUMMARY OF DESCRIBED SUBJECT MATTER

In some embodiments, the present disclosure provides an exemplary technically improved computer-based system/method/apparatus that includes at least the following components/steps of receiving, by at least one processor, an electronic activity verification from an entity, where the electronic activity verification is associated with an electronic activity of a user account verified by an entity, where the electronic activity verification includes: i) a verified value indicative of a value associated with an electronic activity, and ii) a user-specified value indicative of an additional value specified by a user for the electronic activity; generating, by the at least one processor, a feature vector including the verified value and the user-specified value; utilizing, by the at least one processor, an anomalous attribute classification model to ingest the feature vector to determine an anomaly classification based on learned model parameters, where the anomaly classification includes one of: i) an anomalous user-specified value classification, or ii) a non-anomalous user-specified value classification; generating, by the at least one processor, a dispute graphical user interface (GUI) including an alert message and a dispute interface element, where the alert message represents the anomalous user-specified value classification of an incorrect user-specified value of the electronic activity verification, where the dispute interface element includes a user selectable element that upon a user interaction causes an electronic request to dispute the electronic activity verification to prevent an execution of the electronic activity; causing to display, by the at least one processor, the dispute GUI on a user computing device associated with the user; and causing to cancel, by the at least one processor, the electronic activity based on the user interaction with the dispute interface element to prevent the execution of the electronic activity.

In some embodiments, the present disclosure provides another exemplary technically improved computer-based method that includes at least the following steps of receiving, by at least one processor, an electronic activity verification from an entity, where the electronic activity verification is associated with an electronic activity of a user account verified by an entity, where the electronic activity verification includes: i) a verified value indicative of a value associated with an electronic activity, and ii) a user-specified value indicative of an additional value specified by a user for the electronic activity; generating, by the at least one processor, a feature vector including the verified value and the user-specified value; utilizing, by the at least one processor, an anomalous attribute classification model to ingest the feature vector to determine an anomaly classification based on learned model parameters, where the anomaly classification includes one of: i) an anomalous user-specified value classification, or ii) a non-anomalous user-specified value classification; generating, by the at least one processor, a dispute graphical user interface (GUI) including an alert message and a dispute interface element, where the alert message represents the anomalous user-specified value classification of an incorrect user-specified value of the electronic activity verification, where the dispute interface element includes a user selectable element that upon a user interaction causes an electronic request to dispute the electronic activity verification to prevent an execution of the electronic activity; causing to display, by the at least one processor, the dispute GUI on a user computing device associated with the user; determining, by the at least one processor, an error of the anomaly classification based on the user interaction with the dispute interface element; and training, by the at least one processor, the learned model parameters of the anomalous attribute classification model based on the error of the anomaly classification.

In some embodiments, the present disclosure provides another exemplary technically improved computer-based system that includes at least the following components of at least one processor in communication with at least one computer readable storage medium having software instructions stored thereon. The software instructions, when executed, cause the at least one processor to perform steps to: receive an electronic activity verification from an entity, where the electronic activity verification is associated with an electronic activity of a user account verified by an entity, where the electronic activity verification includes: i) a verified value indicative of a value associated with an electronic activity, and ii) a user-specified value indicative of an additional value specified by a user for the electronic activity; generate a feature vector including the verified value and the user-specified value; utilizing, by the at least one processor, an anomalous attribute classification model to ingest the feature vector to determine an anomaly classification based on learned model parameters, where the anomaly classification includes one of: i) an anomalous user-specified value classification, or ii) a non-anomalous user-specified value classification; generate a dispute graphical user interface (GUI) including an alert message and a dispute interface element, where the alert message represents the anomalous user-specified value classification of an incorrect user-specified value of the electronic activity verification, where the dispute interface element includes a user selectable element that upon a user interaction causes an electronic request to dispute the electronic activity verification to prevent an execution of the electronic activity; cause to display the dispute GUI on a user computing device associated with the user; and cause to cancel the electronic activity based on the user interaction with the dispute interface element to prevent the execution of the electronic activity.

In some embodiments, the present disclosure provides the exemplary technically improved computer-based systems and methods that further include receiving, by the at least one processor, for a plurality of users, a history of verified electronic activities and a history of disputed electronic activities; and utilizing, by the at least one processor, the history of verified electronic activities and the history of disputed electronic activities to train model parameters of a machine learning model to obtain the learned model parameter.

In some embodiments, the present disclosure provides the exemplary technically improved computer-based systems and methods that further include determining, by the at least one processor, the user-specified value based on a difference between the verified value and a prior requested value.

In some embodiments, the present disclosure provides the exemplary technically improved computer-based systems and methods that further include determining, by the at least one processor, a user-specified value percentage indicative of a percentage of the verified value associated with the user-specified value.

In some embodiments, the present disclosure provides the exemplary technically improved computer-based systems and methods that further include where the electronic activity verification further includes a merchant identifier and a merchant location identifier.

In some embodiments, the present disclosure provides the exemplary technically improved computer-based systems and methods that further include receiving, by the at least one processor, a user selection of the dispute interface element; generating, by the at least one processor, the electronic request to dispute the electronic activity to automatically issue and file the dispute; and generating, by the at least one processor, an electronic activity invalidation removing the electronic activity verification from a user account of the user.

In some embodiments, the present disclosure provides the exemplary technically improved computer-based systems and methods that further include where the anomalous attribute classification model includes a random forest model.

In some embodiments, the present disclosure provides the exemplary technically improved computer-based systems and methods that further include where the history of verified electronic activities and the history of disputed electronic activities include historical transaction entries and historical dispute entries from a rolling time period preceding the electronic activity verification.

In some embodiments, the present disclosure provides the exemplary technically improved computer-based systems and methods that further include where the rolling time period includes three months preceding the transaction entry.

In some embodiments, the present disclosure provides the exemplary technically improved computer-based systems and methods that further include where the anomalous attribute classification model is retrained according to a predetermined period.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 7 illustrate systems and methods of error detection for user-specified data attributes of electronic activities without an authoritative source of truth. The following embodiments provide technical solutions and technical improvements that overcome technical problems, drawbacks and/or deficiencies in the technical fields involving data error detection in electronic records without a source of truth. As explained in more detail, below, technical solutions and technical improvements herein include aspects of improved electronic activity history trend recognition, error detection based on historical trends, and pre-emptive and pro-active response to mitigate errors. Based on such technical features, further technical benefits become available to users and operators of these systems and methods. Moreover, various practical applications of the disclosed technology are also described, which provide further practical benefits to users and operators that are also new and useful improvements in the art.

Figure 1:
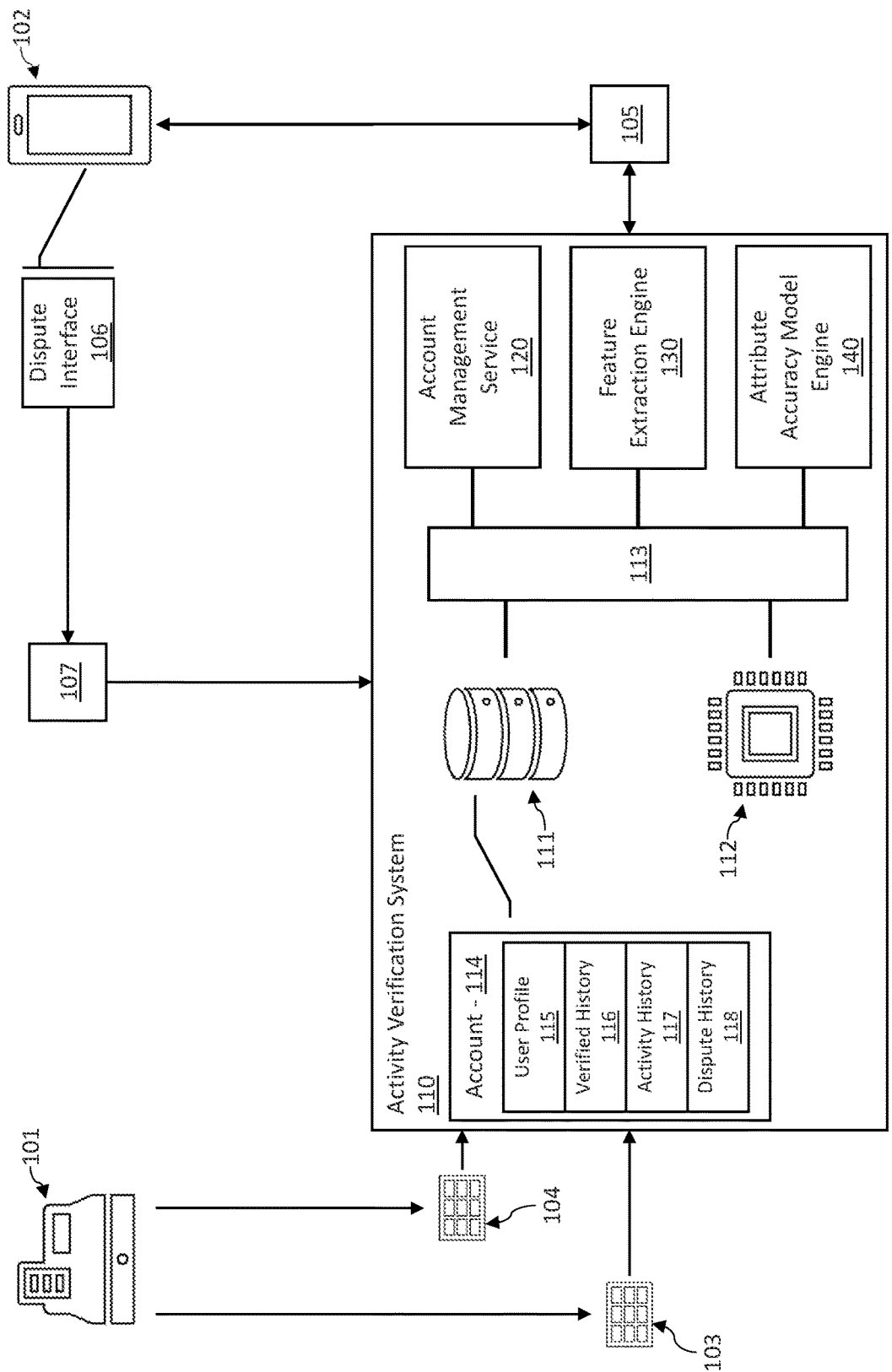
FIGS. 1-7 show one or more schematic flow diagrams, certain computer-based architectures, and/or screenshots of various specialized graphical user interfaces which are illustrative of some exemplary aspects of at least some embodiments of the present disclosure.

FIG. 1 is a block diagram of an exemplary computer-based system for the verification of electronic activities based on historical user-specified post-activity value data in accordance with one or more embodiments of the present disclosure.

In some embodiments, electronic activity request 103 may be submitted to an activity verification system 110 from an activity execution computing device 101. In some embodiments, the electronic activity request 103 may include attributes including user-specified data or user-specified values, hereinafter referred in conjunction or as alternatives or both as "user-specified data items". However, in some circumstances, these user-specified data items may present a vector for inaccuracies due to, e.g., malicious activities or entities, user mistake, or other sources of inaccuracy and combinations thereof.

In some embodiments, to automatically and efficiently detect the inaccuracies in the user-specified data items, the electronic activity request 103 may be provided to an activity verification system 110. The activity verification system 110 may include components for applying machine learning to detect inaccuracies before the inaccuracies effect the user or a user's account. For example, the activity verification system 110 may automatically detect an incorrect tip in a service transaction after the incorrect tip is authorized and posted to a user account, enabling the user to dispute or correct the incorrect tip. Once the user reviews and confirm tip is incorrect, an option is given to correct tip amount and dispute transaction.

In some embodiments, the electronic activity request 103 may include any user activity performed via electronic computing systems, such as, e.g., electronic transactions, communications (e.g., email, text message, internet-based chat, etc.), social media activity, among other electronic activities. Accordingly, in some embodiments, the electronic activity request 103 may be produced by an activity execution computing device 101, such as, e.g., a point-of-sale device, an ecommerce payment system, social media or email communication system, smartphone or other mobile device, desktop or laptop computing device, or other device or application for conducting and executing electronic activities.

In some embodiments, the activity verification system 110 may receive the electronic activity request 103 and, based on the user-specified data items, determine whether the electronic activity request 103 is likely to be correct or incorrect, thereby verifying the electronic activity request 103. In some embodiments, the activity verification system 110 may be a part of the activity execution computing device 101. Thus, the activity verification system 110 may include hardware and software components including, e.g., activity execution computing device 101 hardware and software, cloud or server hardware and software, or a combination thereof.

In some embodiments, the activity verification system 110 may include hardware components such as a processor 112, which may include local or remote processing components. In some embodiments, the processor 112 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 112 may include data-processing capacity provided by the microprocessor. In some embodiments, the microprocessor may include memory, processing, interface resources, controllers, and counters. In some embodiments, the microprocessor may also include one or more programs stored in memory.

Similarly, the activity verification system 110 may include storage 111, such as local hard-drive, solid-state drive, flash drive, database or other local storage, or remote storage such as a server, mainframe, database or cloud provided storage solution.

In some embodiments, the activity verification system 110 may implement computer engines for extracting data attributes and characteristics of the electronic activity request 103 to predict with a machine learning model whether the user-specified data items of the electronic activity request 103 is correct. Accordingly, in some embodiments, the computer engines may include an account management service 120 to manage and utilize account histories of the user, a feature extraction engine 130 to extract the attributes and characteristics, and an attribute accuracy model engine 140 to analyze the extracted attributes and characteristics based on training according to the account histories. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. For example, software may include functions implemented with, e.g., a high level programing languages such as, e.g., Python, Java, Scala, etc. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to determine the errors, the activity verification system 110 may include computer engines including, e.g., the account management service 120, the feature extraction engine 130 and the attribute accuracy model engine 140. In some embodiments, the account management service 120 may receive the electronic activity request 103 and identify an associated user account 114, e.g., stored in the storage 111. In some embodiments, the account management service 120 may extract data items from the electronic activity request 103 including, e.g., a user identifier associated with the electronic activity request 103, a third-party entity identifier associated with the electronic activity request 103, an activity type identifier, an activity value or activity quantity, user-specified data items, an activity description, or other data items representing characteristics of the electronic activity request 103.

For example, in some embodiments, the electronic activity request 103 may include a transaction-related activity, such as a transaction record. In such an example, the data items may include, e.g., a transaction value, a tip amount, an account identifier or a user identifier or both, a merchant identifier, a transaction type, among other transaction data.

In some embodiments, the account management service 120 may compare the user identifier or account identifier to user identifiers or account identifiers of accounts 114 in the storage 111. Using, e.g., an index or database query or other method of searching the storage 111, the account management service 120 may access the associated account 114 to access electronic activity records for the user, including, e.g., a user profile 115, a verified history 116, an activity history 117 and a dispute history 118. In some embodiments, the activity history 117 may include records of authorization or verification requests for electronic activities, e.g., prior to authorization or verification, while the verified history 116 includes records of electronic activities that have been verified. The dispute history 118 may include records of user disputes of verified activities or verification requests.

In some embodiments, the user-specified data may be absent from the electronic activity request 103. In some embodiments, the account management service 120 may record the electronic activity request 103 in cache the electronic activity request 103 in a memory or cache or as an activity record in the activity history 117 of the account 114 or both for later comparison to an electronic activity verification 104 having the user-specified data. The account management service 120 may then compare, e.g., the user identifier or third-party entity identifier or both to match the electronic activity request 103 and the electronic activity verification 104. In some embodiments, based on a difference in the activity value between the electronic activity request 103 and the electronic activity verification 104, the account management service 120 may determine the user-specified data.

For example, for transactions, a first transaction record may be received by the activity verification system 110 including an authorization request before tip. A second transaction record may then be subsequently received including a posted transaction with a tip applied. Accordingly, the second transaction record may include a transaction amount including the amount of the tip. Thus, the difference in transaction value between the authorization request and the posted transaction may indicate the tip applied by the user. Other examples are also contemplated where an electronic activity request 103 and an electronic activity verification 104 following the electronic activity request 103 are employed, such as, e.g., social media posts, text entry, communication or scenario with pre-edited and post-edited records, document versioning, document signatures, among others.

Accordingly, in some embodiments, the account management service 120 may receive both the electronic activity request 103 and the electronic activity verification 104 for recordation in the activity history 117 of the account 114. In some embodiments, recording both the electronic activity request 103 and the electronic activity verification 104 enables the use of both activity requests to determine discrepancies at the activity execution computing device 101. For example, changes to a transaction between a pre-authorization and an authorization at a point-of-sale device may be detected, among other discrepancies.

Therefore, in some embodiments, the user-specified data may be determined based on the discrepancy between the electronic activity request 103 and the electronic activity verification 104. For example, a tip for a service transaction (e.g., food service, delivery service, or other suitable service transaction) may be determined based on the discrepancy between the electronic activity request 103 including an authorization request and the electronic activity verification 104 including a posted transaction record. Accordingly, the account management service 120 may manage accounts 114 based on electronic activity requests 103.

In order to implement the account management service 120, the account management service 120 may be implemented as one or more computer engines that may include software components, hardware components, or a combination thereof. For example, each computer engine may include a dedicated processor and storage. However, in some embodiments, the computer engines share hardware resources, including the processor 112 and storage 111 of the activity verification system 110 via, e.g., a bus 113. Thus, the account management service 120 may include a memory including software and software instructions, such as, e.g. machine learning models and/or logic for accessing, manipulating, modifying and adding to an account 114 stored in the storage 111.

In some embodiments, the feature extraction engine 130 may employ the electronic activity request 103 and the electronic activity verification 104 to extract features for verifying a user-specified value. In some embodiments, as described above, a difference in activity value data items of the electronic activity request 103 and the electronic activity verification 104 for a given electronic activity may be inconsistent with a user's intent for the user-specified data that would otherwise cause the difference. For example, a user-specified tip may not match the actual difference between a pre-authorization request and an authorization request, thus indicating there was some error or bad action in the authorization request.

In some embodiments, the feature extraction engine 130 may extract attributes and characteristics to formulate features for use in a machine learning model to recognize incorrectly requested user-specified data. Accordingly, in some embodiments, the feature extraction engine 130 may extract data items such as, e.g., a date, an amount, a third-party entity identifier, a user identifier, an activity value or activity quantity, an activity type, an activity operation, among other data attributes and characteristics and combinations thereof. For example, in some embodiments, the feature extraction engine 130 may examine metadata associated with each electronic activity request 103 and electronic activity verification 104 to identify, e.g., location, date, entity or device identifiers associated with the origination of the electronic activity request 103 and electronic activity verification 104. However, in some embodiments, one or more of the location, date, entity identifier, device identifier, and other information may be explicitly specified in the electronic activity request 103 and electronic activity verification 104. In some embodiments, the electronic activity request 103 and electronic activity verification 104 may each also specify, e.g., the user identifier, third-party entity identifier, the activity value or activity quantity, the activity type, the activity operation, among other data attributes and characteristics and combinations thereof.

In some embodiments, the feature extraction engine 130 may produce features characterizing differences between the electronic activity request 103 and the electronic activity verification 104 based on the attributes and characteristics extracted from metadata, from the data items specified in the activities, or both. For example, the feature extraction engine 130 may calculate the difference between the activity value of the electronic activity request 103 and the activity value of the electronic activity verification 104 to determine the user-specified data. Additionally, the feature extraction engine 130 may produce statistical metrics of the user-specified data relative to the electronic activity request 103, electronic activity verification 104 or both, such as, e.g., a percentage of the activity value, or other representation of the user-specified data relative to one or both of the electronic activity request 103 and electronic activity verification 104.

For example, the electronic activity request 103 may include a transaction authorization request, and the electronic activity verification 104 may include a posted transaction record. The feature extraction engine 130 may extract, e.g., authorization amount, authorization date or date of transaction, authorization time (e.g., time of swipe at a point of sale device), merchant name, merchant class or merchant category code (MCC), approval status (e.g., approved or denied), transaction identifier, date of transaction posted, time of transaction posted, a posted amount, a difference between the posted amount and the authorization amount (e.g., a tip amount), tip percentage, among other features.

In some embodiments, the feature extraction engine 130 may also extract features from a history of electronic activities, e.g., accessed via the verified history 116, activity history 117 and dispute history 118 of the account 114 associated with the electronic activity request 103. Using the history, the feature extraction engine 130 may generate training data for training a machine learning model to predict whether user-specified data of the electronic activity request 103 and electronic activity verification 104 is likely to be correct or incorrect according to the extracted features. Accordingly, similar to the attributes and characteristics of the electronic activity request 103 and electronic activity verification 104, the feature extraction engine 130 may extract from each entry in the history features including, e.g., location, date, entity or device identifiers, the user identifier, third-party entity identifier, the activity value or activity quantity, the activity type, the activity operation, cancellation or dispute status, activity verification date, among other data attributes and characteristics and combinations thereof.

For example, for a history of posted transactions, authorized transaction and disputed transactions, the feature extraction engine 130 may extract features including, e.g., authorization amount, authorization date or date of transaction, authorization time (e.g., time of swipe at a point of sale device), merchant name, merchant class or merchant category code (MCC), Merchant location details, approval status (e.g., approved or denied), transaction identifier, date of transaction posted, time of transaction posted, a posted amount, a difference between the posted amount and the authorization amount (e.g., a tip amount), tip percentage, dispute status (e.g., disputed or not disputed) as well as tip statistics such as past tip standard deviation and tip average, among other features.

In some embodiments, the feature extraction engine 130 may encode the features extracted from activity records (e.g., the electronic activity request 103, electronic activity verification 104, past verified activities in the verified history 116, past activities in the activity history 117 and past disputed activities in the dispute history 118) into a feature vector. In some embodiments, the feature vector may include a one-dimensional vector of values representing each extracted feature. Accordingly, the feature vector may be efficiently ingested by a machine learning model for prediction.

In order to implement the feature extraction engine 130, the feature extraction engine 130 may be implemented as one or more computer engines that may include software components, hardware components, or a combination thereof. For example, each computer engine may include a dedicated processor and storage. However, in some embodiments, the computer engines share hardware resources, including the processor 112 and storage 111 of the activity verification system 110 via, e.g., a bus 113. Thus, the feature extraction engine 130 may include a memory including software and software instructions, such as, e.g. generating and determining attributes characterizing the user-specified data items relative to attributes and characteristics of the electronic activity request 103.

In some embodiments, the attribute accuracy model engine 140 may ingest the feature vector produced by the feature extraction engine 130, e.g., by receiving the feature vector via the bus 113, or directly from the feature extraction engine 130. In some embodiments, the feature vector can include features from verified activities, requested activities, and differences between corresponding verified and requested activities. Using such features, a machine learning model, such as an anomalous attribute model, may be trained to predicting anomalous attributes of a requested electronic activity based on the dispute history 118.

In some embodiments, the dispute history 118 may include electronic activities that have been verified by the account management service 120 but disputed by a user. Accordingly, the dispute history 118 may be used to construct a training set of electronic activities having anomalous attributes, such as one or more incorrect user-specified data items. The electronic activities in the dispute history 118 may be matched up with the corresponding requested and/or verified activities from the verified history 116 and activity history 117 to construct training labels for each unique electronic activity. Thus, feature vectors for each unique electronic activity can be ingested by the machine learning model for prediction, and the prediction may be compared against the training label for each unique electronic activity to determine a loss with which to train the machine learning model.

In some embodiments, based on the training, the attribute accuracy model engine 140 may predict, e.g., a prediction of correct user-specified data for the electronic activity request 103, a classification of correct or anomalous user-specified data for the electronic activity request 103, or other form of prediction. Accordingly, the attribute accuracy model engine 140 may employ, e.g., a regression model or a classifier model, or other suitable machine learning model or combination thereof.

In some embodiments, the attribute accuracy model engine 140 may be configured to utilize one or more exemplary AI or machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values, functions and aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, regression or classifier models may produce a numerical output. For example, a classifier may produce a numerical probability between 0.0 and 1.0 representing, e.g., a probability of anomalous user-specified data based on the user's account 114. Accordingly, to form a determination of whether the electronic activity request 103 and electronic activity verification 104 include anomalous user-specified data, the attribute accuracy model engine 140 may compare the probability of anomalous user-specified data to a probability threshold, where a probability greater than the probability threshold indicates a prediction of anomalous user-specified data 105. Alternatively, the probability may indicate a probability of non-anomalous user-specified data (e.g., correct user-specified data). Accordingly, the probability of non-anomalous user-specified data exceeding the probability threshold would indicate a prediction of non-anomalous user-specified data, and the probability of non-anomalous user-specified data being below the probability threshold would indicate the prediction of anomalous user-specified data 105.

Similarly, a regression model may predict a numerical value that may be compared against a threshold. For example, the regression model may predict, e.g., an expected or forecasted user-specified data for the electronic activity request 103 and electronic activity verification 104 based on training against user-specified data of each activity in the verified history 116 and the dispute history 118. The forecasted user-specified data may be compared to the user-specified data determined from the electronic activity request 103 and the electronic activity verification 104, and the difference may be compared against a value threshold. For example, the value threshold may be, e.g., a number of standard deviations based on an average user-specified data in the verified history (e.g., 2, 3, 4, 5 or greater number of standard deviations).

In some embodiments, the value threshold may be learned from the dispute history 118 based on the features of each activity disputed in the dispute history 118. In some embodiments, where the forecasted user-specified data and the user-specified data determined from the electronic activity request 103 and electronic activity verification 104 differ by an amount greater than the value threshold, the attribute accuracy model engine 140 may determine the prediction of anomalous user-specified data 105.

In order to implement the attribute accuracy model engine 140, the attribute accuracy model engine 140 may be implemented as one or more computer engines that may include software components, hardware components, or a combination thereof. For example, each computer engine may include a dedicated processor and storage. However, in some embodiments, the computer engines share hardware resources, including the processor 112 and storage 111 of the activity verification system 110 via, e.g., a bus 113. Thus, the attribute accuracy model engine 140 may include a memory including software and software instructions, such as, e.g. machine learning models and/or logic for predicting whether the user-specified data items of the electronic activity request 103 are correct based on learning user behavior.

In some embodiments, upon prediction of the anomalous user-specified data 105, the activity verification system 110 may notify a user of the anomalous user-specified data 105, e.g., via a user computing device 102. In some embodiments, the user computing device 102 may be any suitable computing device, such as, e.g., a laptop computer, desktop computer, tablet, smartphone, smartwatch, or other computing device including mobile devices, wearables, et cetera.

In some embodiments, the activity verification system 110 may generate a notification including the prediction of the anomalous user-specified data 105 to deliver to the user computing device 102. For example, the notification may include, e.g., an email, a simple message service (SMS) message, a multi-media message service (MMS) message, a rich communication service (RCS) message, an internet messaging message (e.g., Apple iMessage, WhatsApp, Facebook Messenger, Signal, Telegram, Skype, or other internet-based messaging service), social media message, telephone call, or any other suitable messaging technique. In some embodiments, the notification may be an application notification, such as, e.g., a push notification from an application associated with the activity verification system 110 (e.g., a banking application, social media application, or other suitable application).

In some embodiments, where the anomalous user-specified data 105 is identified, the anomalous user-specified data 105 may indicate that the electronic activity verification 104 is incorrect, fraudulent or otherwise erroneous. As a result, the user may dispute the electronic activity verification 104 based on the user-specified data associated therewith being incorrect, and thereof anomalous user-specified data 105. Therefore, the user computer device 102 may be configured to produce a dispute interface 106 in response to the anomalous user-specified data 105.

In some embodiments, the user computing device 102 may include a software application or program that include functionality to detect the receipt of the anomalous user-specified data 105 and produce the dispute interface 106 in response. In some embodiments, the anomalous user-specified data 105 includes functionality to cause the user computing device 102 to display the dispute interface 106. For example, the notification of the anomalous user-specified data 105 may include a link that, upon selection, may automatically generate an internet-based request to dispute the electronic activity verification 104. In another example, the user computing device 102 may include an application associated with the activity verification system 110 that may generate and display the dispute interface 106 automatically in response to the anomalous user-specified data 105.

In some embodiments, the dispute interface 106 may include user interface elements that provide details of the anomalous user-specified data 105 to the user. For example, the dispute interface 106 may identify the electronic activity request 103 and the electronic activity verification 104 associated with the anomalous user-specified data 105, the third-party entity associated with the electronic activity request 103 and the electronic activity verification 104, a date of the electronic activity request 103 and the electronic activity verification 104, the determined user-specified data based on the difference between the electronic activity request 103 and the electronic activity verification 104, among other suitable information. In some embodiments, accompanying the information may be a user-selectable interface element providing one-click functionality to dispute the electronic activity verification 104 on the grounds of the anomalous user-specified data 105. Selection of this one-click interface element may produce an activity dispute 107 and issue the activity dispute 107 to the activity verification system 110.

In some embodiments, the user computing device 102 may issue the activity dispute 107 by communicating the activity dispute 107 to the activity verification system 110. In some embodiments, the activity dispute 107 may trigger in the activity verification system 110, e.g., by the account management service 120, a process to dispute the electronic activity verification 104. In some embodiments, the dispute may automatically invalidate the electronic activity verification 104 and remove the electronic activity verification 104 from the verified history 116 of the account 114. In some embodiments, the dispute may also send a request to the activity execution computing device 101 to modify or correct the electronic activity verification 104, or any other suitable response to the dispute 107. Accordingly, the activity verification system 110 may enable users to quickly and efficiently correct errors and fraud in electronic activities via the real-time efficient automatic detection and notification of anomalous user-specified data 105.

Figure 2A:
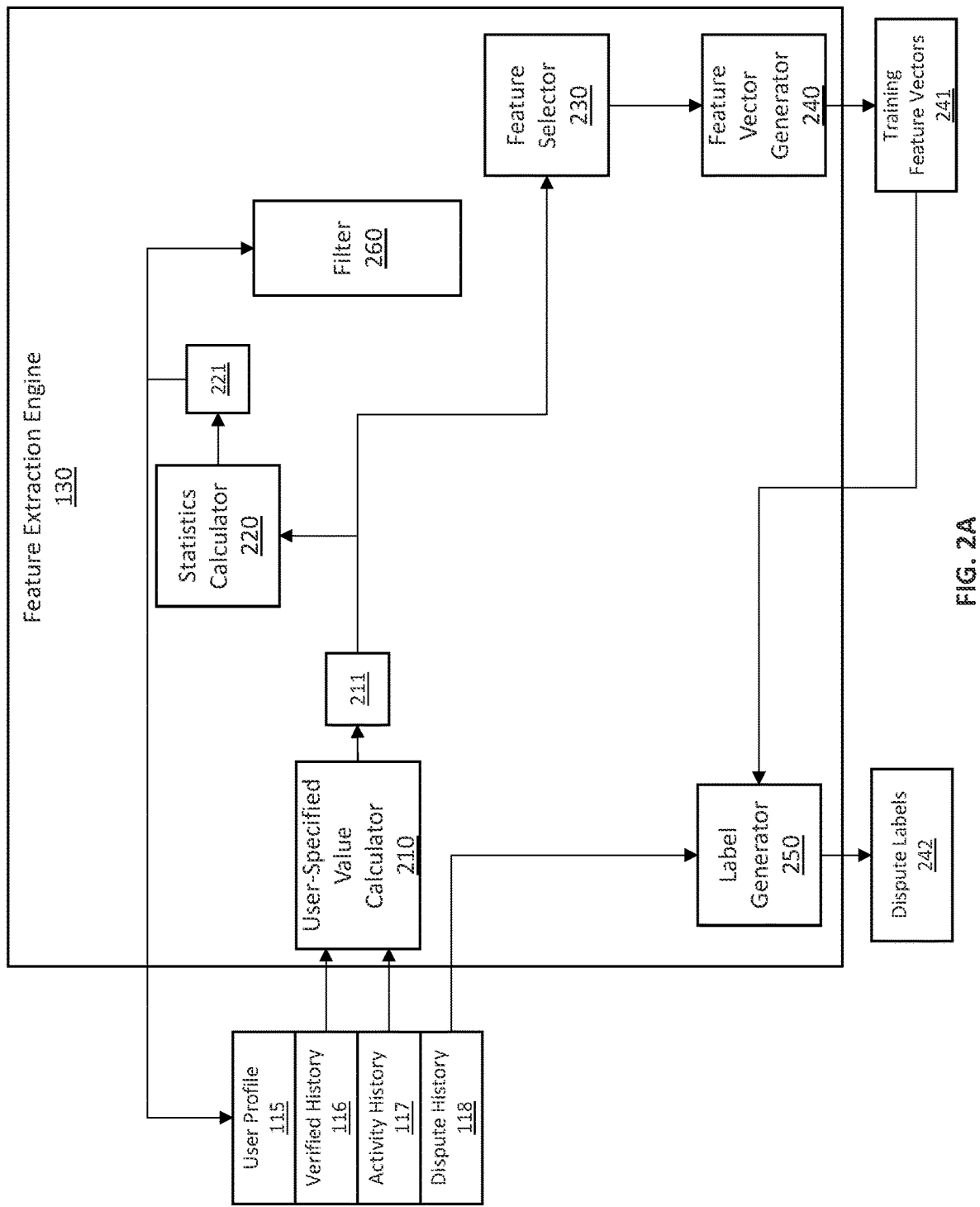

FIG. 2A is a block diagram of another exemplary computer-based system including a training arrangement of a feature extraction engine for the verification of electronic activities based on historical user-specified value data in accordance with one or more embodiments of the present disclosure.

In some embodiments, the feature extraction engine 130 may use the account 114 of a user to generate a training dataset for prediction of anomalous or incorrect user-specified data in electronic activities associated with the user. To facilitate quick and accurate detection of the anomalous user-specified data (e.g., anomalous user-specified data 105 as described above), the feature extraction engine 130 may leverage the user's account 114 to build a training dataset and a user profile 115 of user behaviors. The training dataset for a user's account may be leveraged to train a machine learning model of the attribute accuracy model engine 140 to be customized for the machine learning model to the user's behavior.

Accordingly, in some embodiments, the feature extraction engine 130 accessed electronic activity data from an account associated with the user including verified electronic activity records from a verified history 116 and electronic activity request records from an activity history 117. In some embodiments, based on the records of the verified electronic activity records and the electronic activity request records, the feature extraction engine 130 may produce a set of training feature vectors 241 with a training feature vector for each electronic activity associated with the user.

In some embodiments, each record in the verified history 116 may include, e.g., activity data of a verified electronic activity, e.g., activity identifier of the associated electronic activity, location, date, device identifiers, the user identifier, third-party entity identifier, the verified activity value or activity quantity, the activity type, the activity operation, activity verification date, among other data attributes and characteristics and combinations thereof.

In some embodiments, each record in the activity history 117 may include, e.g., activity data of a verification request, e.g., activity identifier of the associated electronic activity, location, date, device identifiers, the user identifier, third-party entity identifier, a requested activity value or activity quantity, the activity type, the activity operation, activity verification date, among other data attributes and characteristics and combinations thereof.

In some embodiments, the dispute history 118 may include records of user disputes in response to electronic activity requests, verified electronic activities or both. Accordingly, each record in the dispute history 118 may include, e.g., Dispute data including, e.g., activity identifier of the associated electronic activity, disputed attributes or characteristics (e.g., location, date, device identifiers, the user identifier, third-party entity identifier, the requested activity value or activity quantity, the verified activity value or activity quantity, the activity type, the activity operation, or other disputed item), among other dispute related data and combinations thereof.

In some embodiments, because user-specified data is determined from a difference between a verified electronic activity and an electronic activity request, the training dataset can include all records associated with electronic activities having a verified electronic activity record in the verified history 116. Accordingly, in some embodiments, a user-specified value calculator 210 may utilize the records from the verified history 116 and the activity history 117 to determine a user-specified value associated with each electronic activity.

In some embodiments, the user-specified value calculator 210 may extract activity data that may be used to identify a particular electronic activity from each record in the verified history 116 in order to match each record in the verified history 116 to a record in the activity history 117 associated with the same particular electronic activity. For example, the user-specified value calculator 210 may extract the activity identifier from a record in the verified history 116 and match it to a common activity identifier in a record in the activity history 117, thus identifying the verified electronic activity record and the electronic activity request record associated with a particular electronic activity.

In some embodiments, an activity identifier may not be present in each record. Accordingly, in some embodiments, the user-specified value calculator 210 may instead or additionally employ a parsing mechanism to parse each record and match verified electronic activity records with electronic activity request records according to similarity. For example, the user-specified value calculator 210 may extract, e.g., a date, a location, a third-party entity, an entity type, or any other suitable information and combinations thereof from each record. The information may then be compared between pairings of verified electronic activity records with electronic activity request records and scored according to, e.g., Pearson's correlation, Spearman's correlation, Kendall's Tau, Cosine similarity, Jaccard similarity, or other similarity metric and combinations thereof. In some embodiments, the pairings may be scored according to, e.g., the Euclidean distance, the Manhattan distance, or other suitable distance metrics and combinations thereof. The electronic activity request record having the highest score for each verified electronic activity record may be deemed to match. Alternatively, or in combination, the electronic activity request record having a score relative to each verified electronic activity that exceeds a similarity threshold may be deemed to match.

In some embodiments, based on the matched electronic activity request record with each verified electronic activity record, the user-specified value calculator 210 may calculate a user-specified value for the associated electronic activity. As described above, in some embodiments, an electronic activity may include a user-specified portion that includes a change to the activity value. For example, in electronic transactions, a user may apply a tip for a service such that a posted transaction has a greater monetary value than the authorized value of the transaction authorization request. Thus, the user-specified value calculator 210 may extraction the requested activity value from the electronic activity verification request record and the verified activity value from the verified electronic activity record and calculate the difference. As a result, the user-specified value calculator 210 may determine the user-specified data 211 for the electronic activity associated with the electronic activity verification request record and the verified electronic activity record.

In some embodiments, the user-specified value calculator 210 may iterate through each pair of a matched electronic activity request record and verified electronic activity record to calculate the user-specified data 211 for each electronic activity. In some embodiments, an absolute value or magnitude for the user-specified data 211 may not be useful without additional information related to the electronic activity. But using both the user-specified data 211 and the additional information as features increases complexity.

Thus, to reduce complexity and improve efficiency while maintaining insight into context and how the user-specified data 211 relates to the electronic activity, the user-specified value calculator 210 may also determine the user-specified data 211 as a percent difference. For example, the user-specified value calculator 210 may calculate the percent of verified activity value for the difference or the percent of requested activity value for the difference. Alternatively, or additionally, the user-specified value calculator 210 may calculate a ratio of verified activity value to the difference, or vice versa, or a ratio of requested activity value to the difference, or vice versa.

In some embodiments, not all electronic activities include user-specified data. Accordingly, the user-specified value calculator 210 can output the user-specified data 211 where the difference, percentage, or ratio is a non-zero value. Where the user-specified data 211 is zero, the electronic activity may be ignored as an electronic activity and/or type of electronic activity that does not include user-specified data.

In some embodiments, it can be advantageous to track user behaviors with respect to user-specified data for later use, such as, e.g., by data filters or other purposes. Accordingly, the user-specified data 211 may be passed to a statistics calculator 220 to perform statistical analysis and characterize trends in the user-specified data 211 of the records in the account. Based on the statistical analysis, the statistics calculator 220 can produce a user-specified data statistic 221 to be recorded in the user profile 115

For example, the statistics calculator may use the aggregate of all user-specified data 211 identified in the account to determine, e.g., average user-specified value amount, average user-specified value percentage, average user-specified value ratio, user-specified value standard deviation, user-specified value percentage standard deviation, user-specified value ratio standard deviation, median user-specified value amount, median user-specified value percentage, median user-specified value ratio, among other statistical determinations and combinations thereof. In some embodiments, the statistics calculator 220 may determine user-specified data statistic 221 including, e.g., a regressive function representing the user-specified value behaviors, such as, e.g., a linear regression and r-squared value, or other similar regression. For example, the regression function can represent, e.g., user-specified value amount as a function of verified activity value, user-specified value percentage as a function of verified activity value, user-specified value amount as a function of requested activity value, user-specified value percentage as a function of verified activity value, or other function and combinations thereof.

In some embodiments, the user-specified data statistic 221 may be employed to configure a filter 260 that can serve to separate user-specified data 211 that is likely accurate. Indeed, the filter 260 can provide more efficient data analysis than a machine learning model that ingests the features extracted by the feature extraction engine 130 but does not take context or other factors into account, increasing the risk of error. Accordingly, the filter 260 may be configured to filter user-specified data 211 from analysis and later prediction where there is a pre-determined degree of statistical confidence that the user-specified data 211 conforms to past user behavior. For example, the filter 260 may be configured to test each user-specified data 211 against, e.g., the user-specified data amount, user-specified data average, user-specified data median, user-specified data standard deviation, or other user-specified data statistic 221 and combinations thereof. In some embodiments, for example, the filter 260 is configured to filter the user-specified data 211 if the user-specified data 211 is within a predetermined number of standard deviations of the mean or median, such as, e.g., two standard deviations for equal to or over 95% confidence interval, or greater than two standard deviations for greater than 95% confidence, such as for a 99% confidence interval or greater than a 99% confidence interval, or other suitable confidence interval.

In some embodiments, the filter 260 may utilize the user-specified data statistic 221 from an entirety of the user account. However, rather than including entire histories, the filter 260 may be updated with a rolling window of user-specified data statistics 221. Using the rolling window approach, the filter 260 may be configured to test user-specified data 211 against a user's recent behaviors. Accordingly, filter 260 may include user-specified data statistics 221 from both new records of the verified history 116, the activity history 117 and the dispute history 118, as well as old records from within the rolling window. For example, the rolling window may span a period of time include, e.g., 1 month, 2 months, 3 months, 4 months, 5 months, 6 months or greater.

In some embodiments, the user-specified data 211 may also be provided to a feature selector 230 to identify and extract attributes associated with the electronic activity and the user-specified data 211. In some embodiments, the user-specified data 211 may be tested first at the filter 260 and removed before the feature selector 230 where it is deemed within the confidence interval as described above. Filtering the user-specified data 211 during training dataset creation can help avoid overfitting of the machine learning model trained with the training dataset. Although, in some embodiments, for building the training dataset, the filter 260 may be skipped and the user-specified data 211 may be provided directly to the feature selector 230.

In some embodiments, the feature selector 230 identifies and extracts attributes of the user-specified data 211 and associated electronic activity that are relevant to the determination of anomalous user-specified data. In some embodiments, the relevant attributes can be predefined according to, e.g., selection by an administrative user administering the feature extraction engine 130, or other suitable method for determining predefined attributes to extract. In some embodiments, the predefined attributes can be adjusted at any time, e.g., by the administrative user, or may be fixed.

In some embodiments, examples of relevant attributes may include, e.g., third-party entity identifier, requested activity amount, verified activity amount, date, time, location, user-specified data amount, user-specified data percentage, third-party entity type, among other suitable attributes predictive of user-specified data 211 veracity or as an anomaly. In some embodiments, for example, the electronic activity may include a transaction for a service in which the user specifies a tip as the user-specified data 211. Relevant attributes for such a transaction that may be predictive of tip veracity could include, e.g., merchant name, merchant type (e.g., merchant category code (MCC)), transaction amount in the electronic authorization request, transaction amount in the posted transaction, tip amount, tip percentage (e.g., relative to the electronic authorization request, posted transaction, or both), date of transaction, location of transaction, among other suitable attributes and combinations thereof.

In some embodiments, the feature selector 230 may include dynamic or learned attributes predictive of an anomalous user-specified data 211 or the veracity of the user-specified data 211. For example, a statistical model may be employed for, e.g., univariate selection, a correlation matrix with heatmap, or other suitable statistical model for feature selection. In an example, the model is a machine learning model for selecting attributes according to feature importance, such as, e.g., a suitable feature selection classifier, or other suitable machine learning model for feature importance.

In some embodiments, the attributes may be encoded into a training feature vector 241 by a feature vector generator 240. In some embodiments, the training feature vector 241 may be configured for ingestion by a machine learning model to produce an anomaly classification that indicates whether the user-specified data 211 is anomalous or accurate. Accordingly, the feature vector generator 240 may encode each attribute into a numerical encoding. For example, attributes that already have a numerical value (e.g., requested activity amount, verified activity amount, user-specified data percentage, etc.) may have a numerical encoding equivalent to the numerical value, while attributes that include character strings or other non-numerical data types can be converted to a numerical value. In some embodiments, attributes with non-numerical data types may include, e.g., third-party entity identifier, date, location, etc. These attributes may be converted to numerical values using, e.g., a per-character numerical assignment to each character of the attribute, a numerical label based on predefined assignments of attributes to a numerical value (e.g., each merchant category code having a particular assigned numerical value to represent each merchant category code) or other suitable encoding technique.

In some embodiments, the feature vector generator 240 may generate a vector representation of the encoded attributes in, e.g., an n-dimensional vector, such as a one dimensional vector. For example, the vector representation may include a one dimensional vector having a length corresponding to the number of the selected attributes. The encoding of each attribute may then be recorded in a predefined index location in the one dimensional vector to produce the training feature vector 241 representative of the selected relevant attributes.

In some embodiments, the feature extraction engine 130 may analyze each verified electronic activity record in the verified history 116 to determine the user-specified data 211, user-specified data statistic 221, feature selection and activity feature vector 241 for each electronic activity for which a user-specified data 211 is ascertainable. To use these training feature vectors 241 as a training dataset for training a machine learning model, the feature extraction engine 130 may advantageously automatically generate dispute labels 242.

In some embodiments, the label generator 250 may extract activity data that may be used to identify a particular electronic activity from each record in the dispute history 118 in order to match each record in the dispute history 118 to each record in the verified history 116 associated with the same particular electronic activity. For example, the label generator 250 may extract the activity identifier from a record in the dispute history 118 and match it to a common activity identifier in a record in the verified history 116, thus identifying the disputed electronic activity record and the verified electronic activity request record associated with a particular electronic activity. Therefore, the label generator 250 may identify electronic activities that have been verified with user-specified data 211 but have been disputed by a user as having incorrect or otherwise anomalous user-specified data.

Similar to the user-specified value calculator 210 above, in some embodiments, an activity identifier may not be present in each record. Accordingly, in some embodiments, the label generator 250 may instead or additionally employ a parsing mechanism to parse each record and match verified electronic activity records with electronic activity request records according to similarity. For example, the label generator 250 may extract, e.g., a date, a location, a third-party entity, an entity type, or any other suitable information and combinations thereof from each record. The information may then be compared between pairings of verified electronic activity records with electronic activity request records and scored according to, e.g., Pearson's correlation, Spearman's correlation, Kendall's Tau, Cosine similarity, Jaccard similarity, or other similarity metric and combinations thereof. In some embodiments, the pairings may be scored according to, e.g., the Euclidean distance, the Manhattan distance, or other suitable distance metrics and combinations thereof. The electronic activity request record having the highest score for each verified electronic activity record may be deemed to match. Alternatively, or in combination, the electronic activity request record having a score relative to each verified electronic activity that exceeds a similarity threshold may be deemed to match.

In some embodiments, based on the disputed electronic activity record matched to each verified electronic activity record, the label generator 250 may determine a dispute attribute for each verified electronic activity, and thus for each training feature vector 241. For example, during training, the label generator 250 may access a training feature vector 241 to be ingested by the machine learning model and compare the verified electronic activity of the training feature vector 241 to the disputed electronic activity records and generate for that training feature vector 241 a dispute label 242 indicating whether the training feature vector 241 has been disputed. While training, the machine learning model may use the dispute label 242 for each training feature vector 241 assess the accuracy of the prediction by the machine learning model and determine an error. As a result, the feature extraction engine 130 may utilize an account to build a training dataset to training a machine learning model for the associated user's behaviors in specifying user-specified data.

In some embodiments, the training dataset may be updated using new batches of electronic activities in the user's account. In some embodiments, the batches may be provided periodically, such as, e.g., real-time, every day, every week, every month, or according to any other suitable period. For example, for electronic activities including electronic transactions for services, the period may include every statement period where transactions and dispute are posted to the user's account.

In some embodiments, rather than updating the training dataset with new records, the training dataset may be reconstructed with a rolling window of electronic activities. By reconstruction rather than updating the training dataset, the attribute accuracy model engine 140 may be trained against a user's recent behaviors. Accordingly, each batch may include both new records of the verified history 116, the activity history 117 and the dispute history 118, as well as old records from within the rolling window. For example, the rolling window may span a period of time include, e.g., 1 month, 2 months, 3 months, 4 months, 5 months, 6 months or greater. Accordingly, the training dataset may be formed from recent user behaviors of user-specified data.

Figure 2B:
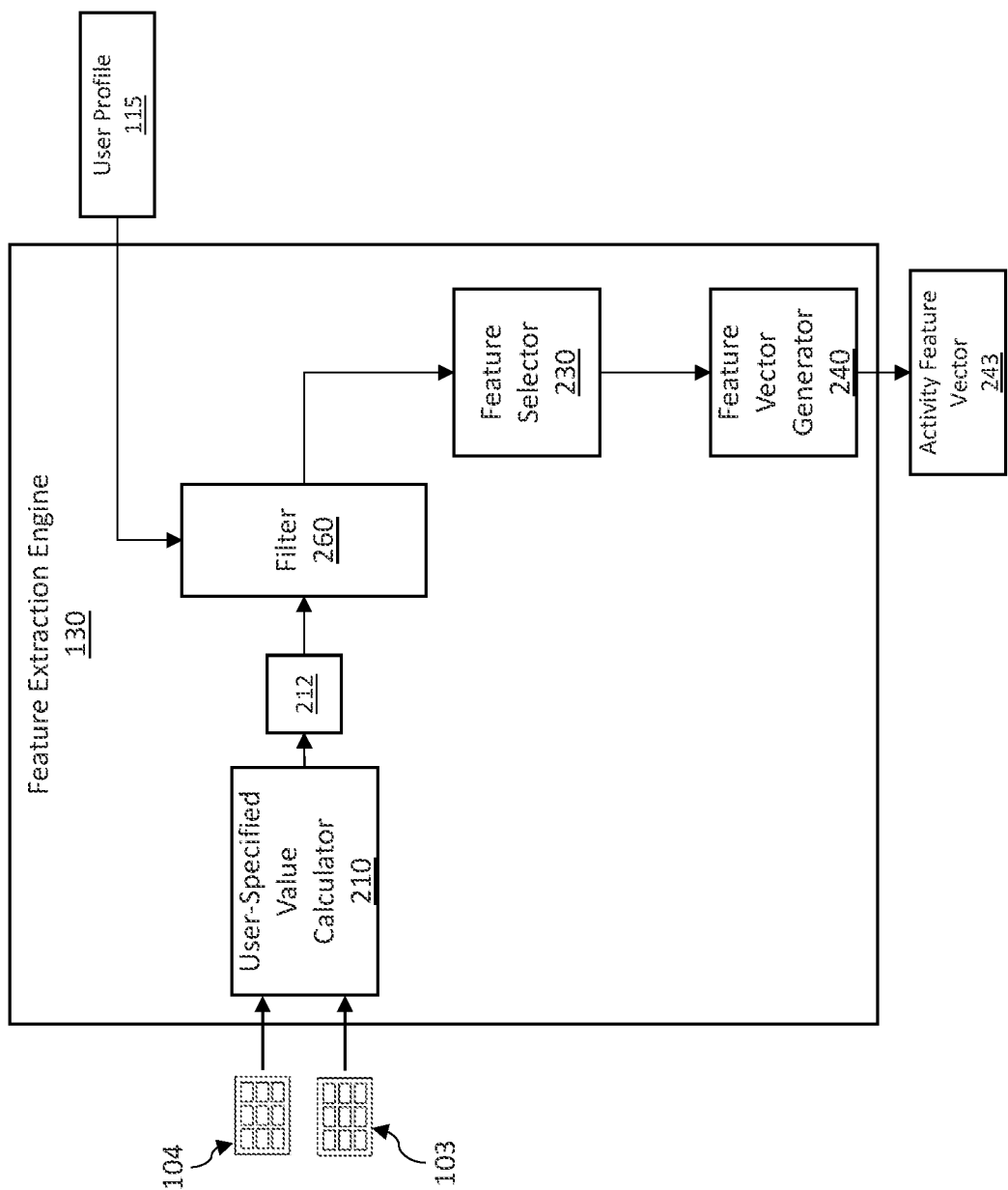

In some embodiments, the feature extraction engine 130 may perform a similar process to generate an activity feature vector 243 for the electronic activity request 103 and electronic activity verification 104, as show in FIG. 2B. FIG. 2B is a block diagram of another exemplary computer-based system including a prediction arrangement of the feature extraction engine of FIG. 2A for the verification of electronic activities based on historical user-specified value data in accordance with one or more embodiments of the present disclosure.

In some embodiments, the feature extraction engine 130 may use the electronic activity request 103 and electronic activity verification 104. In some embodiments, user-specified data is determined from a difference between the electronic activity verification 104 and the electronic activity request 103. Accordingly, in some embodiments, a user-specified value calculator 210 may utilize the electronic activity verification 104 and the electronic activity request 103 to determine a user-specified data associated with the electronic activity common to both the electronic activity verification 104 and the electronic activity request 103.

In some embodiments, the user-specified value calculator 210 may extract activity data that may be used to identify the electronic activity from the electronic activity verification 104 and the electronic activity request 103. For example, the user-specified value calculator 210 may extract the activity identifier from one or both of the electronic activity verification 104 and the electronic activity request 103.

In some embodiments, the user-specified value calculator 210 may instead or additionally employ a parsing mechanism to parse each of the electronic activity verification 104 and the electronic activity request 103. For example, the user-specified value calculator 210 may extract, e.g., a date, a location, a third-party entity, an entity type, or any other suitable information and combinations thereof from each of the electronic activity verification 104 and the electronic activity request 103.

In some embodiments, the user-specified value calculator 210 may calculate a user-specified data 212 for the electronic activity of the electronic activity verification 104 and the electronic activity request 103. As described above, in some embodiments, an electronic activity may include a user-specified portion that includes a change to the activity value. For example, in electronic transactions, a user may apply a tip for a service such that a posted transaction has a greater monetary value than the authorized value of the transaction authorization request. Thus, the user-specified value calculator 210 may extraction the requested activity value from the electronic activity verification request record and the verified activity value from the verified electronic activity record and calculate the difference. As a result, the user-specified value calculator 210 may determine the user-specified data 212 for the electronic activity.

In some embodiments, an absolute value or magnitude for the user-specified data 212 may not be useful without additional information related to the electronic activity. But using both the user-specified data 212 and the additional information as features increases complexity. Thus, to reduce complexity and improve efficiency while maintaining insight into context and how the user-specified data 212 relates to the electronic activity, the user-specified value calculator 210 may also determine the user-specified data 212 as a percent difference. For example, the user-specified value calculator 210 may calculate the percent of verified activity value for the difference or the percent of requested activity value for the difference. Alternatively, or additionally, the user-specified value calculator 210 may calculate a ratio of verified activity value to the difference, or vice versa, or a ratio of requested activity value to the difference, or vice versa.

In some embodiments, not all electronic activities include user-specified data. Accordingly, the user-specified value calculator 210 can output the user-specified data 212 where the difference, percentage, or ratio is a non-zero value. Where the user-specified data 212 is zero, the electronic activity may be ignored as an electronic activity and/or type of electronic activity that does not include user-specified data.

In some embodiments, it can be advantageous to track user behaviors with respect to user-specified data 212 for later use, such as, e.g., by data filters or other purposes. Accordingly, the user-specified data 212 may be passed to a statistics calculator, such as the statistics calculator 220 described above, to perform statistical analysis and characterize trends in the user-specified data 212 of the records in the account. Based on the statistical analysis, the statistics calculator 220 can produce a user-specified data statistic 221 to be recorded in the user profile 115.

In some embodiments, the user-specified data statistic 221 may be employed to configure the filter 260 as described above that can serve to separate user-specified data 212 that is likely accurate. Indeed, the filter 260 can provide more efficient data analysis than a machine learning model that ingests the features extracted by the feature extraction engine 130 but does not take context or other factors into account, increasing the risk of error. Accordingly, the filter 260 may be configured to filter user-specified data 212 from analysis and later prediction where there may be a predetermined degree of statistical confidence that the user-specified data 212 conforms to past user behavior. For example, the filter 260 may be configured to test each user-specified data 212 against, e.g., the user-specified data amount, user-specified data average, user-specified data median, user-specified data standard deviation, or other user-specified data statistic 221 and combinations thereof.

In some embodiments, the user-specified data 212 may also be provided to a feature selector 230 to identify and extract attributes associated with the electronic activity and the user-specified data 212. In some embodiments, the user-specified data 212 may be tested first at the filter 260 and removed before the feature selector 230 where it is deemed within the confidence interval as described above. Filtering the user-specified data 212 during prediction can help reduce resource usage because a data filter is less complex than a machine learning model, though the data filter is also less accurate and sophisticated in determining anomalous user-specified data as context varies.

In some embodiments, the feature selector 230 identifies and extracts attributes of the user-specified data 212 and associated electronic activity that are relevant to the determination of anomalous user-specified data. In some embodiments, the relevant attributes can be predefined according to, e.g., selection by an administrative user administering the feature extraction engine 130, or other suitable method for determining predefined attributes to extract. In some embodiments, the predefined attributes can be adjusted at any time, e.g., by the administrative user, or may be fixed.

In some embodiments, examples of relevant attributes may include, e.g., third-party entity identifier, requested activity amount, verified activity amount, date, time, location, user-specified data amount, user-specified data percentage, third-party entity type, among other suitable attributes predictive of user-specified data 212 veracity or as an anomaly. In some embodiments, for example, the electronic activity may include a transaction for a service in which the user specifies a tip as the user-specified data 212. Relevant attributes for such a transaction that may be predictive of tip veracity could include, e.g., merchant name, merchant type (e.g., merchant category code (MCC)), transaction amount in the electronic authorization request, transaction amount in the posted transaction, tip amount, tip percentage (e.g., relative to the electronic authorization request, posted transaction, or both), date of transaction, location of transaction, among other suitable attributes and combinations thereof.

In some embodiments, the feature selector 230 may include dynamic or learned attributes predictive of an anomalous user-specified data 212 or the veracity of the user-specified data 212. For example, a statistical model may be employed for, e.g., univariate selection, a correlation matrix with heatmap, or other suitable statistical model for feature selection. In an example, the model is a machine learning model for selecting attributes according to feature importance, such as, e.g., a suitable feature selection classifier, or other suitable machine learning model for feature importance.

In some embodiments, the attributes may be encoded into an activity feature vector 243 by a feature vector generator 240. In some embodiments, the activity feature vector 243 may be configured for ingestion by a machine learning model to produce an anomaly classification that indicates whether the user-specified data 212 is anomalous or accurate. Accordingly, the feature vector generator 240 may encode each attribute into a numerical encoding. For example, attributes that already have a numerical value (e.g., requested activity amount, verified activity amount, user-specified data percentage, etc.) may have a numerical encoding equivalent to the numerical value, while attributes that include character strings or other non-numerical data types can be converted to a numerical value. In some embodiments, attributes with non-numerical data types may include, e.g., third-party entity identifier, date, location, etc. These attributes may be converted to numerical values using, e.g., a per-character numerical assignment to each character of the attribute, a numerical label based on predefined assignments of attributes to a numerical value (e.g., each merchant category code having a particular assigned numerical value to represent each merchant category code) or other suitable encoding technique.

In some embodiments, the feature vector generator 240 may generate a vector representation of the encoded attributes in, e.g., an n-dimensional vector, such as a one dimensional vector. For example, the vector representation may include a one dimensional vector having a length corresponding to the number of the selected attributes. The encoding of each attribute may then be recorded in a predefined index location in the one dimensional vector to produce the activity feature vector 243 representative of the selected relevant attributes. As a result, the feature extraction engine 130 may encode an electronic activity and an associated user-specified data 212 (e.g., a user-specified value or quantity, or other data) into an activity feature vector 243 for use by a machine learning model to predict whether the user-specified data 212 is anomalous or accurate based on context as represented by the attributes of the electronic activity.

Figure 3A:
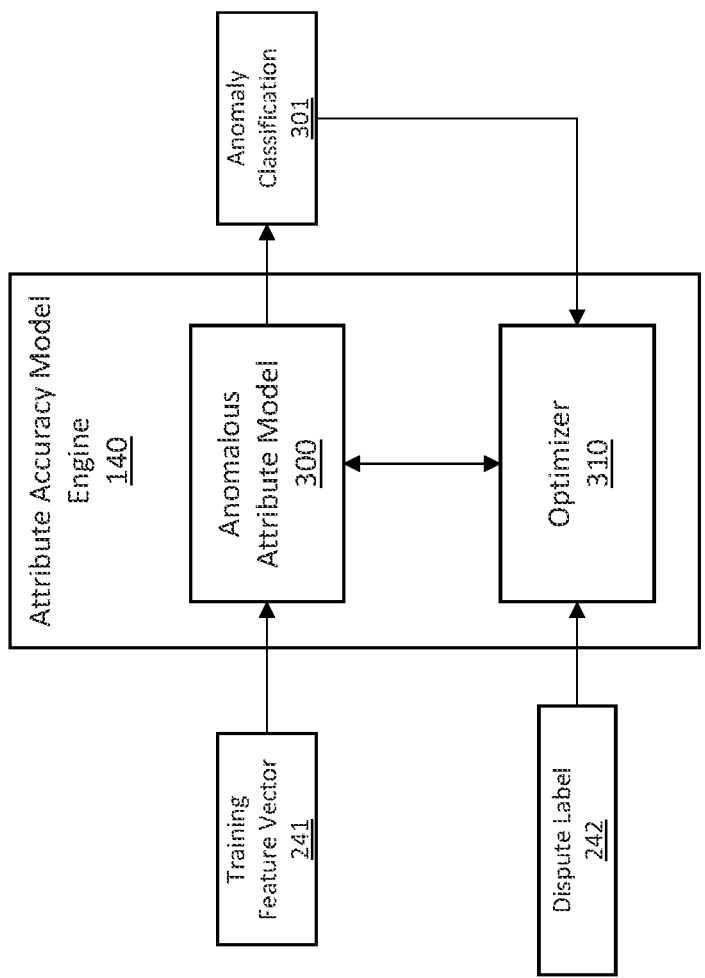

FIG. 3A is a block diagram of another exemplary computer-based system including a training arrangement of an attribute accuracy model engine for the verification of electronic activities based on historical user-specified post-activity value data in accordance with one or more embodiments of the present disclosure.

In some embodiments, an attribute accuracy model engine 140 may be employed to train an anomalous attribute model 300 to predict anomaly classifications 301 for a user based on the training feature vectors 241 associated with the user's account, e.g., as described above with reference to FIG. 2A.

In some embodiments, the anomalous attribute model 300 ingests each training feature vector 241 and produces a prediction of an anomaly classification 301 for each training feature vector 241. In some embodiments, to produce this prediction, the anomalous attribute model 300 may include a machine learning model including a classification model, such as, e.g., a convolutional neural network (CNN), a Naive Bayes classifier, decision trees, random forest, support vector machine (SVM), K-Nearest Neighbors, or any other suitable algorithm for a classification model. Accordingly, the anomalous attribute model 300 ingests a training feature vector 241 and processes the attributes encoded therein using the classification model to produce a model output vector. In some embodiments, the model output vector may be decoded to generate a label including the anomaly classification 301.

In some embodiments, the model output vector may include or may be decoded to reveal a numerical output, e.g., a probability value between 0 and 1. In some embodiments, the probability value may indicate a degree of probability that the user-specified data of the training feature vector 241 is anomalous. In some embodiments, the anomalous attribute model 300 may test the probability value against a probability threshold, where a probability value greater than the probability threshold indicates, e.g., that the user-specified data is anomalous, or that the user-specified data is not anomalous. For example, the probability threshold can be, e.g., greater than 0.5, greater than 0.6, greater than 0.7, greater than 0.8, greater than 0.9, or other suitable threshold value. In some embodiments, the anomalous attribute model 300 may produce the anomaly classification 301 based on the probability value and the probability threshold. For example, the anomaly classification 301 may include a classification as anomalous where the probability value is greater than the probability threshold. However, the anomalous attribute model 300 may configured such that the anomaly classification 301 may include a classification as not anomalous where the probability value is greater than the probability threshold.

In some embodiments, the anomalous attribute model 300 may trained based on the anomaly classification 301 for the training feature vector 241 and the dispute label 242 for the training feature vector 241. Based on the difference between the anomaly classification 301 and the dispute label 242, the parameters of the classification model of the anomalous attribute model 300 may be updated to improve the accuracy of the anomaly classification.

In some embodiments, training is performed using an optimizer 310. In some embodiments, the anomaly classification 301 fed back to the optimizer 310. The optimizer 310 may also ingest the dispute label 242. In some embodiments, the optimizer 310 may employ a loss function, such as, e.g., Hinge Loss, Multi-class SVM Loss, Cross Entropy Loss, Negative Log Likelihood, or other suitable classification loss function. The loss function determines an error based on the dispute label 242 and the anomaly classification 301. In some embodiments, the optimizer 310 may, e.g., backpropagate the error to the anomalous attribute model 300 to update the parameters using, e.g., gradient descent, heuristic, convergence or other optimization techniques and combinations thereof.

In some embodiments, the optimizer 310 may therefore train the parameters of the anomalous attribute model 300 to approximate user behaviors in specifying user-specified data based on the dispute labels 242. The attribute accuracy model engine 140 may iterate through each training feature vector 241 in the training dataset, including predicting an anomaly classification 301 and updating parameters of the anomalous attribute model 300 based on the associated dispute label 242.

In some embodiments, the attribute accuracy model engine 140 may be updated using new batches of training datasets from new electronic activities in the user's account. In some embodiments, the batches may be provided periodically, such as, e.g., every day, every week, every month, or according to any other suitable period. For example, for electronic activities including electronic transactions for services, the period may include every statement period where transactions and dispute are posted to the user's account.

In some embodiments, rather than updating the attribute accuracy model engine 140, the attribute accuracy model engine 140 may be retrained on a rolling window of electronic activities. By retraining rather than updating the model parameters, the attribute accuracy model engine 140 may be trained against a user's recent behaviors. Accordingly, each batch received periodically may include both new records of the verified history 116, the activity history 117 and the dispute history 118, and old records from within the rolling window. For example, the rolling window may span a period of time include, e.g., 1 month, 2 months, 3 months, 4 months, 5 months, 6 months or greater. Accordingly, the attribute accuracy model engine 140 may be trained against recent user behaviors of user-specified data.

Figure 3B:
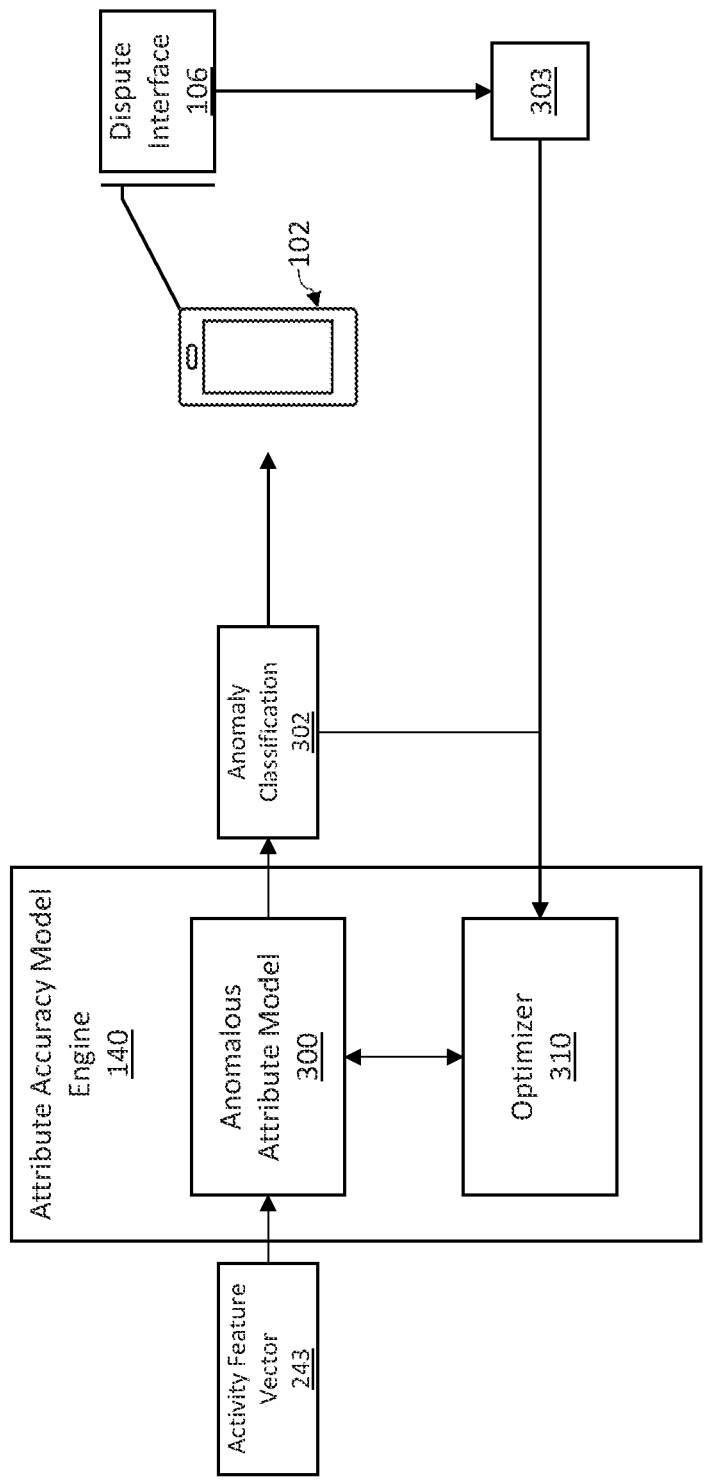

FIG. 3B is a block diagram of another exemplary computer-based system including a prediction arrangement of the attribute accuracy model engine of FIG. 3A for the verification of electronic activities based on historical user-specified post-activity value data in accordance with one or more embodiments of the present disclosure.

In some embodiments, the attribute accuracy model engine 140 may utilize the anomalous attribute model 300 (e.g., trained as described above with reference to FIG. 3A) to predict an anomaly classification 302 for the activity feature vector 243 associated with the user's account, e.g., the activity feature vector 243 as described above with reference to FIG. 2B.

In some embodiments, the anomalous attribute model 300 ingests the activity feature vector 243 and produces a prediction of an anomaly classification 302 for the activity feature vector 243. In some embodiments, to produce this prediction, the anomalous attribute model 300 may include a machine learning model including a classification model, such as, e.g., a convolutional neural network (CNN), a Naive Bayes classifier, decision trees, random forest, support vector machine (SVM), K-Nearest Neighbors, or any other suitable algorithm for a classification model. Accordingly, the anomalous attribute model 300 ingests the activity feature vector 243 and processes the attributes encoded therein using the classification model to produce a model output vector. In some embodiments, the model output vector may be decoded to generate a label including the anomaly classification 302.

In some embodiments, the model output vector may include or may be decoded to reveal a numerical output, e.g., a probability value between 0 and 1. In some embodiments, the probability value may indicate a degree of probability that the user-specified data of the activity feature vector 243 is anomalous. In some embodiments, the anomalous attribute model 300 may test the probability value against a probability threshold, where a probability value greater than the probability threshold indicates, e.g., that the user-specified data is anomalous, or that the user-specified data is not anomalous. For example, the probability threshold can be, e.g., greater than 0.5, greater than 0.6, greater than 0.7, greater than 0.8, greater than 0.9, or other suitable threshold value. In some embodiments, the anomalous attribute model 300 may produce the anomaly classification 302 based on the probability value and the probability threshold. For example, the anomaly classification 302 may include a classification as anomalous where the probability value is greater than the probability threshold. However, the anomalous attribute model 300 may configured such that the anomaly classification 302 may include a classification as not anomalous where the probability value is greater than the probability threshold.

In some embodiments, where the anomaly classification 302 includes a classification label of anomalous for the activity feature vector 243 and associated user-specified data, the anomaly classification 302 may be provided to the user computing device 102, e.g., as a prediction of the anomalous user-specified data 105 described above with reference to FIG. 1. In some embodiments, the anomaly classification 302 of the anomalous user-specified data 105 may trigger the user computing device 102 to generate and display the dispute interface 106. In some embodiments, the dispute interface 106 includes a depiction or representation of, e.g., the user-specified data, the electronic activity attributes, the electronic activity request 103, the electronic activity verification 104, or a combination thereof, as well as an interface element to confirm or deny the anomaly classification 302. For example, the user may input a user interaction 303 with an option to confirm the anomaly classification 302 as correct or deny the anomaly classification 302 as incorrect. In some embodiments, the user interaction 303 may include a user selection of a confirm option or a deny option relative to the anomaly classification 302.

In some embodiments, the user interaction 303 may also include a lack of a selection. For example, the user may choose to ignore the alert of the dispute interface 106, e.g., by selecting an "ignore" element, or by not providing any selection at all. In some embodiments, where the user ignores the dispute interface 106, the lack of selection may be interpreted as a command to not take action for the anomaly classification 302. Where the anomaly classification 302 includes a classification as anomalous, a command to not take action may represent a denial that the user-specified data is anomalous. Conversely, where the anomaly classification 302 includes a classification as non-anomalous, a command to not take action may represent a confirmation that the user-specified data is non-anomalous. Accordingly, the user interaction 303 may include an indication of a confirmation or denial of the anomaly classification 302 based on whether the anomaly classification 302 is anomalous or non-anomalous.

In some embodiments, in the case of the lack of any selection, the user interaction 303 may be determined to be an ignore interaction after a predetermined period of time has elapsed without any user selection. For example, the optimizer 310 may include a timer that starts upon generation of the anomaly classification 302 and ends upon the predetermined time period elapsing. Alternatively, or in addition, the user computing device 102 and/or dispute interface 106 may include the timer that starts upon receiving the anomaly classification 302. In some embodiments, the predetermined period of time may include any suitable time period for user interaction with the dispute interface 106, such as, e.g., 15 seconds, 20 seconds, 30 seconds, 40 seconds, 45 seconds, 1 minute, 2 minutes, 5 minutes, or any other suitable time period.

In some embodiments, the anomalous attribute model 300 may trained based on the anomaly classification 302 and the user interaction 303. Based on the difference between the anomaly classification 302 and the user interaction 303, the parameters of the classification model of the anomalous attribute model 300 may be updated to improve the accuracy of the anomaly classification.

In some embodiments, training is performed using the optimizer 310. In some embodiments, the anomaly classification 302 fed back to the optimizer 310. The optimizer 310 may also ingest the dispute label 242. In some embodiments, the optimizer 310 may employ a loss function, such as, e.g., Hinge Loss, Multi-class SVM Loss, Cross Entropy Loss, Negative Log Likelihood, or other suitable classification loss function. The loss function determines an error based on the user interaction 303 and the anomaly classification 302. In some embodiments, the optimizer 310 may, e.g., backpropagate the error to the anomalous attribute model 300 to update the parameters using, e.g., gradient descent, heuristic, convergence or other optimization techniques and combinations thereof.

In some embodiments, the optimizer 310 may therefore train the parameters of the anomalous attribute model 300 to approximate user behaviors in specifying user-specified data based on feedback including the user interaction 303. As a result, the anomalous attribute model 300 may be continually trained and optimized based on user feedback.

Figure 4:
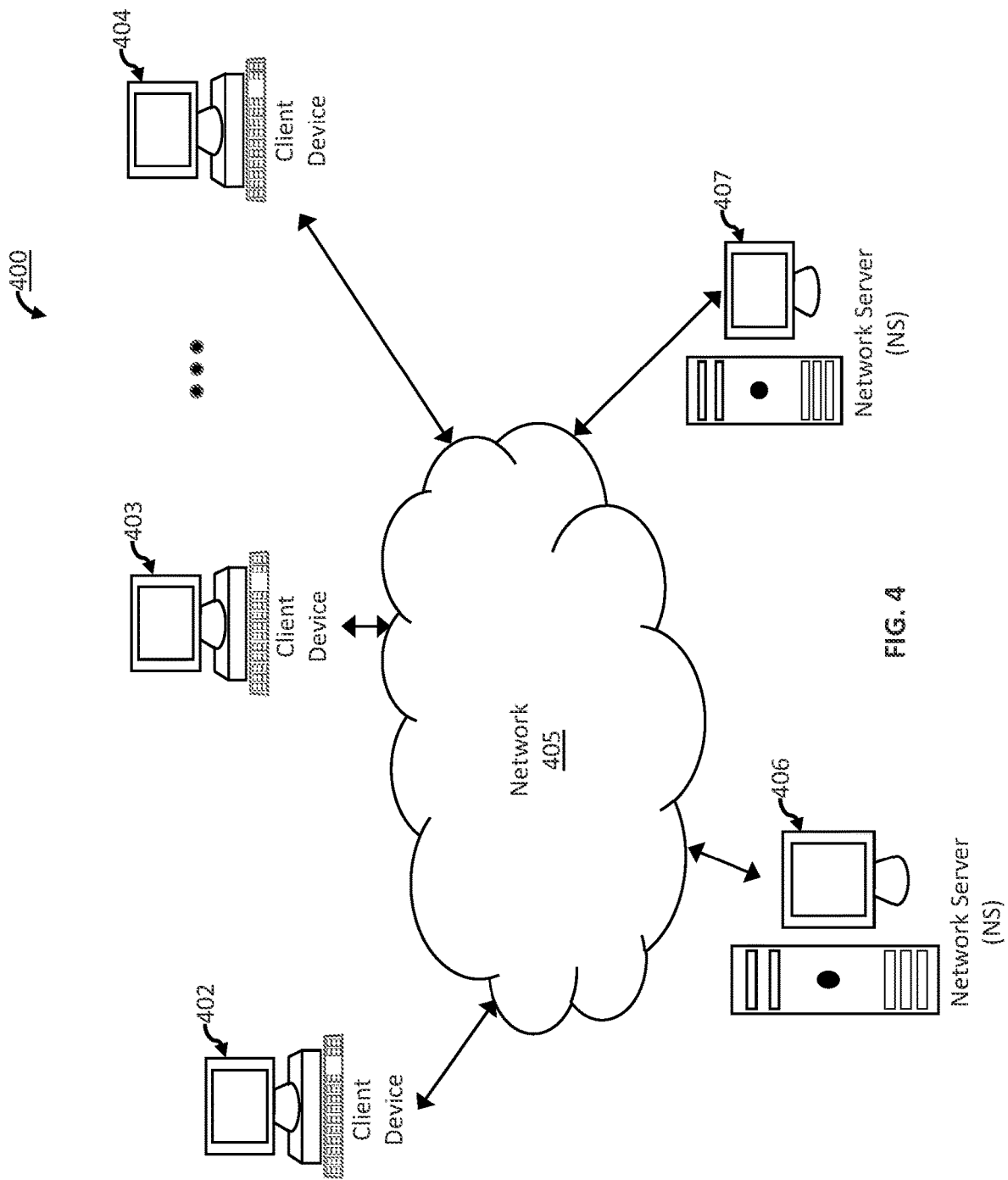

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, members 402-404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
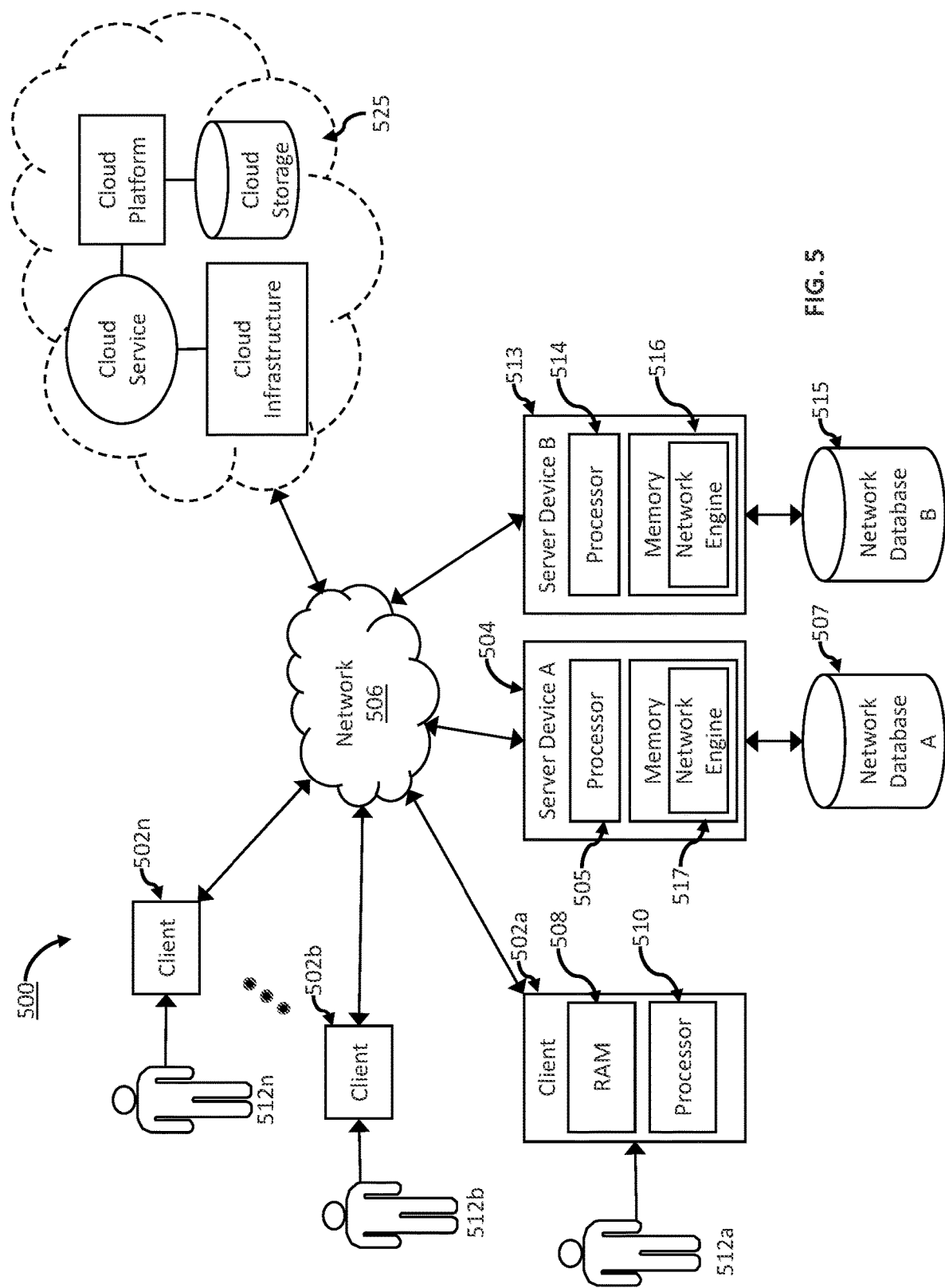

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 502n, may communicate over the exemplary network 506 with each other and/or with other systems and/or devices coupled to the network 506. As shown in FIG. 5, exemplary server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
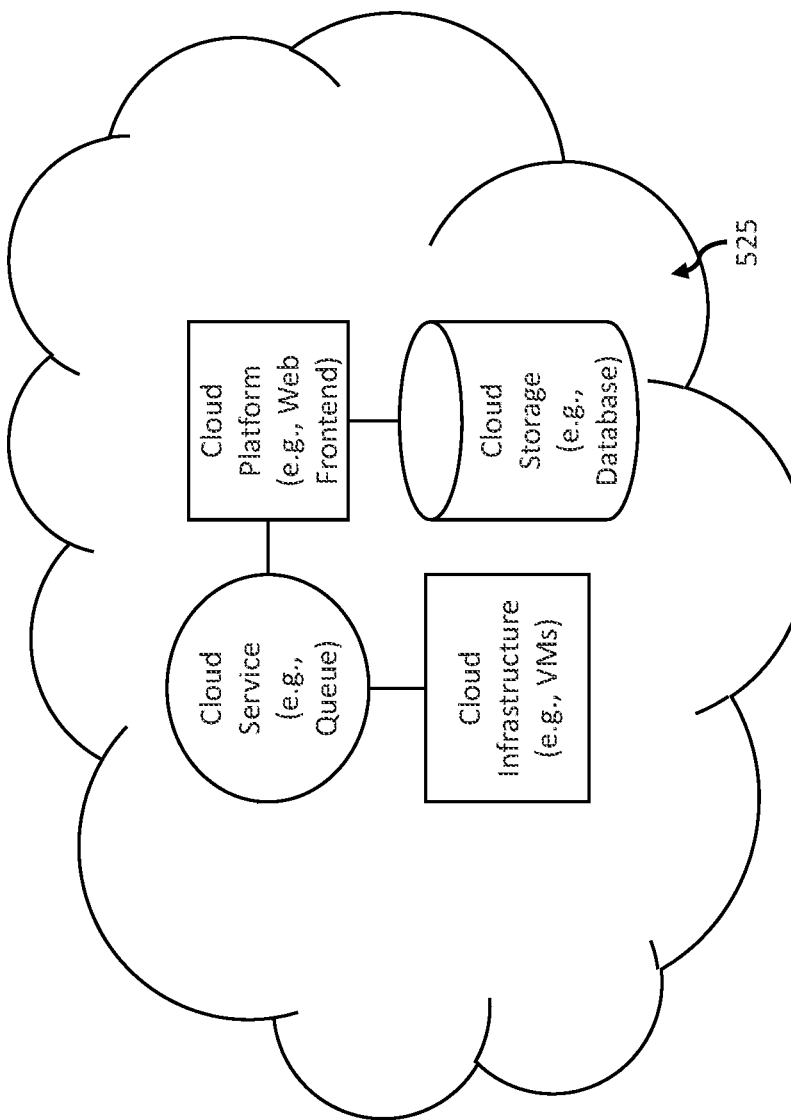
Figure 7:
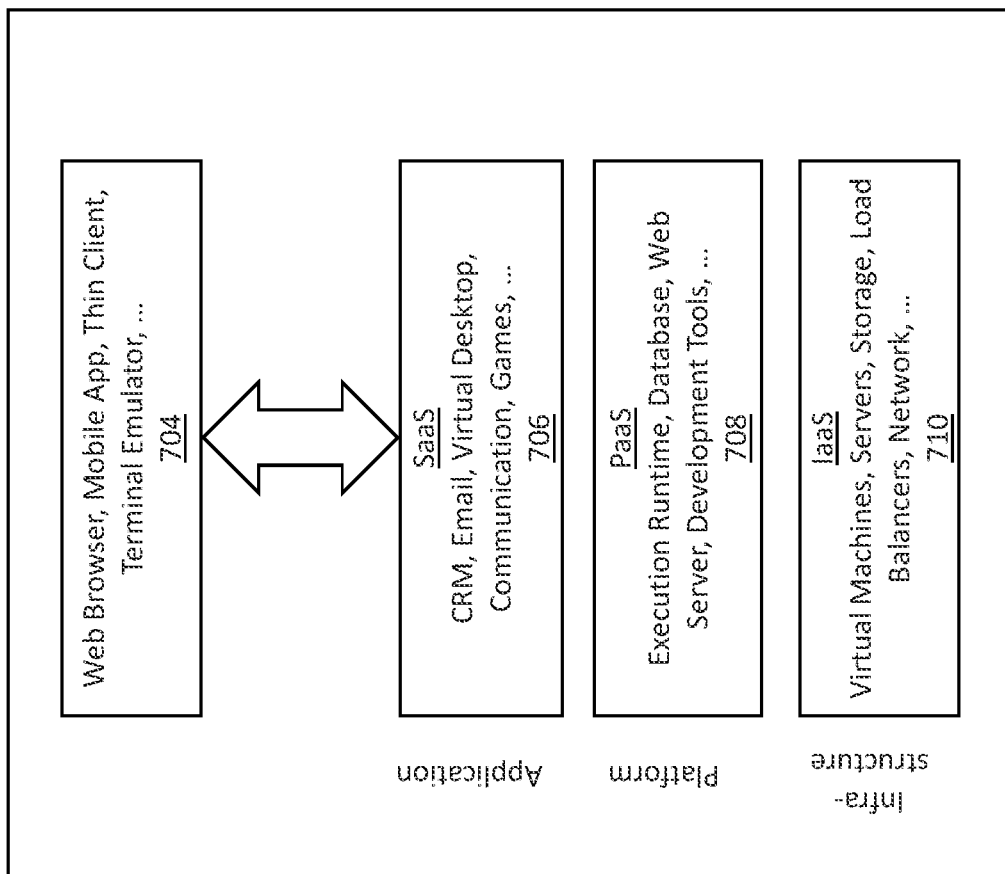

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, Scala, NodeJS, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

At least some aspects of the present disclosure will now be described with reference to the following numbered clauses.

1. A method comprising:
    receiving, by at least one processor, an electronic activity verification from an entity;
        wherein the electronic activity verification is associated with an electronic activity of a user account verified by an entity;
        wherein the electronic activity verification comprises:
            i) a verified value indicative of a value associated with an electronic activity, and
            ii) a user-specified value indicative of an additional value specified by a user for the electronic activity;
    generating, by the at least one processor, a feature vector comprising the verified value and the user-specified value;
    utilizing, by the at least one processor, an anomalous attribute classification model to ingest the feature vector to determine an anomaly classification based on learned model parameters;
        wherein the anomaly classification comprises one of:

i) an anomalous user-specified value classification, or ii) a non-anomalous user-specified value classification;

generating, by the at least one processor, a dispute graphical user interface (GUI) comprising an alert message and a dispute interface element;

wherein the alert message represents the anomalous user-specified value classification of an incorrect user-specified value of the electronic activity verification;

wherein the dispute interface element comprises a user selectable element that upon a user interaction causes an electronic request to dispute the electronic activity verification to prevent an execution of the electronic activity;

causing to display, by the at least one processor, the dispute GUI on a user computing device associated with the user; and causing to cancel, by the at least one processor, the electronic activity based on the user interaction with the dispute interface element to prevent the execution of the electronic activity.

2. A method comprising:

receiving, by at least one processor, an electronic activity verification from an entity;

wherein the electronic activity verification is associated with an electronic activity of a user account verified by an entity;

wherein the electronic activity verification comprises:

i) a verified value indicative of a value associated with an electronic activity, and ii) a user-specified value indicative of an additional value specified by a user for the electronic activity;

generating, by the at least one processor, a feature vector comprising the verified value and the user-specified value;

utilizing, by the at least one processor, an anomalous attribute classification model to ingest the feature vector to determine an anomaly classification based on learned model parameters;

wherein the anomaly classification comprises one of:

i) an anomalous user-specified value classification, or ii) a non-anomalous user-specified value classification;

generating, by the at least one processor, a dispute graphical user interface (GUI) comprising an alert message and a dispute interface element;

wherein the alert message represents the anomalous user-specified value classification of an incorrect user-specified value of the electronic activity verification;

wherein the dispute interface element comprises a user selectable element that upon a user interaction causes an electronic request to dispute the electronic activity verification to prevent an execution of the electronic activity;

causing to display, by the at least one processor, the dispute GUI on a user computing device associated with the user;

determining, by the at least one processor, an error of the anomaly classification based on the user interaction with the dispute interface element; and training, by the at least one processor, the learned model parameters of the anomalous attribute classification model based on the error of the anomaly classification.

3. A system comprising:

at least one processor in communication with at least one computer readable storage medium having software instructions stored thereon, wherein the software instructions, when executed, cause the at least one processor to perform steps to:

receive an electronic activity verification from an entity;

wherein the electronic activity verification is associated with an electronic activity of a user account verified by an entity;

wherein the electronic activity verification comprises:

i) a verified value indicative of a value associated with an electronic activity, and ii) a user-specified value indicative of an additional value specified by a user for the electronic activity;

generate a feature vector comprising the verified value and the user-specified value;

utilizing, by the at least one processor, an anomalous attribute classification model to ingest the feature vector to determine an anomaly classification based on learned model parameters;

wherein the anomaly classification comprises one of:

i) an anomalous user-specified value classification, or ii) a non-anomalous user-specified value classification;

generate a dispute graphical user interface (GUI) comprising an alert message and a dispute interface element;

wherein the alert message represents the anomalous user-specified value classification of an incorrect user-specified value of the electronic activity verification;

wherein the dispute interface element comprises a user selectable element that upon a user interaction causes an electronic request to dispute the electronic activity verification to prevent an execution of the electronic activity;

cause to display the dispute GUI on a user computing device associated with the user; and cause to cancel the electronic activity based on the user interaction with the dispute interface element to prevent the execution of the electronic activity.

4. The systems and methods as recited in any of clauses 1 through 3, further comprising:

receiving, by the at least one processor, for a plurality of users, a history of verified electronic activities and a history of disputed electronic activities; and utilizing, by the at least one processor, the history of verified electronic activities and the history of disputed electronic activities to train model parameters of a machine learning model to obtain the learned model parameter.

5. The systems and methods as recited in any of clauses 1 through 3, further comprising determining, by the at least one processor, the user-specified value based on a difference between the verified value and a prior requested value.

6. The systems and methods as recited in any of clauses 1 through 3, further comprising determining, by the at least one processor, a user-specified value percentage indicative of a percentage of the verified value associated with the user-specified value.

7. The systems and methods as recited in any of clauses 1 through 3, wherein the electronic activity verification further comprises a merchant identifier and a merchant location identifier.

8. The systems and methods as recited in any of clauses 1 through 3, further comprising:
receiving, by the at least one processor, a user selection of the dispute interface element;
generating, by the at least one processor, the electronic request to dispute the electronic activity to automatically issue and file the dispute; and
generating, by the at least one processor, an electronic activity invalidation removing the electronic activity verification from a user account of the user.

9. The systems and methods as recited in any of clauses 1 through 3, wherein the anomalous attribute classification model comprises a random forest model.

10. The systems and methods as recited in any of clauses 1 through 3, wherein the history of verified electronic activities and the history of disputed electronic activities comprise historical transaction entries and historical dispute entries from a rolling time period preceding the electronic activity verification.

11. The systems and methods as recited in clause 10, wherein the rolling time period comprises three months preceding the transaction entry.

12. The systems and methods as recited in clause 10, wherein the anomalous attribute classification model is retrained according to a predetermined period.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added, and/or any desired steps may be eliminated).

The invention claimed is:

1. A method comprising:
receiving, by at least one processor, an electronic activity verification from an entity;
wherein the electronic activity verification is associated with an electronic activity of a user account verified by an entity;
wherein the electronic activity verification comprises a verified value indicative of a value associated with the electronic activity;
accessing, by the at least one processor, an electronic activity history, the electronic activity history comprising:
a plurality of electronic activity requests indicative of a plurality of initializations of electronic activities pending approval by the user, and
a plurality of electronic activity verifications indicative of a plurality of user verifications of the electronic activities upon approval by the user of the plurality of electronic activity requests;
filtering, by the at least one processor, the plurality of electronic activity requests in the electronic activity history by a predetermined time period associated with the electronic activity verification to identify at least one candidate electronic activity request;
utilizing, by the at least one processor, at least one similarity measure to determine a similarity between the at least one candidate electronic activity request and the electronic activity verification;
determining, by the at least one processor, a particular electronic activity request of the at least one candidate electronic activity request based at least in part on the at least one similarity measure and a similarity threshold value;
determining, by the at least one processor, a user-specified value indicative of an additional value specified by a user for the electronic activity based at least in part on a difference between the particular electronic activity request and the electronic activity verification;
encoding, by the at least one processor, the verified value and the user-specified value into a feature vector;
inputting, by the at least one processor, the feature vector into an anomalous attribute classification machine learning model to output an anomaly classification, wherein the anomalous attribute classification machine learning model comprises a plurality of trained machine learning model parameters trained to predict a likelihood of user dispute of the verified electronic activity based on training data comprising:
a history of verified electronic activities and
a history of disputed electronic activities;
wherein the anomaly classification comprises one of:
i) an anomalous user-specified value classification, or
ii) a non-anomalous user-specified value classification;
generating, by the at least one processor, a dispute graphical user interface (GUI) comprising an alert message and a dispute interface element;
wherein the alert message represents the anomalous user-specified value classification of an incorrect user-specified value of the electronic activity verification;
wherein the dispute interface element comprises a user selectable element configured to enable a user to perform a user selection to dispute the electronic activity or accept the electronic activity, wherein the user selection to dispute the electronic activity causes an electronic request to dispute the electronic activity verification to prevent an execution of the electronic activity;
causing to display, by the at least one processor, the dispute GUI on a user computing device associated with the user;
receiving, by the at least one processor, a user selection of the user selectable element;
wherein the user selection causes the at least one processor to:
determine a classification error of the anomalous attribute classification machine learning model based on the anomaly classification and the user selection; and
retrain the plurality of trained machine learning model parameters of the anomalous attribute classification machine learning model based at least in part on the error to improve accuracy of the anomaly classification for the user; and
inputting, by the at least one processor, into the anomalous attribute classification machine learning model, a subsequent feature vector of a subsequent electronic activity verification to output a subsequent anomaly classification based at least in part on the plurality of trained machine learning model parameters having been retrained based on the user selection.

2. The method as recited in claim 1, further comprising:
receiving, by the at least one processor, for a plurality of users, a history of verified electronic activities and a history of disputed electronic activities; and
utilizing, by the at least one processor, the history of verified electronic activities and the history of disputed electronic activities to train model parameters of a machine learning model to obtain the learned model parameters.

3. The method as recited in claim 1, further comprising determining, by the at least one processor, the user-specified value based on a difference between the verified value and a prior requested value.

4. The method as recited in claim 1, further comprising determining, by the at least one processor, a user-specified value percentage indicative of a percentage of the verified value associated with the user-specified value.

5. The method as recited in claim 1, wherein the electronic activity verification further comprises a merchant identifier and a merchant location identifier.

6. The method as recited in claim 1, further comprises:
receiving, by the at least one processor, a user selection of the dispute interface element;
generating, by the at least one processor, the electronic request to dispute the electronic activity to automatically issue and file the dispute; and
generating, by the at least one processor, an electronic activity invalidation removing the electronic activity verification from a user account of the user.

7. The method as recited in claim 1, wherein the anomalous attribute classification model comprises a random forest model.

8. The method as recited in claim 2, wherein the history of verified electronic activities and the history of disputed electronic activities comprise historical transaction entries and historical dispute entries from a rolling time period preceding the electronic activity verification.

9. The method as recited in claim 8, wherein the rolling time period comprises three months preceding the transaction entry.

10. The method as recited in claim 8, wherein the anomalous attribute classification model is retrained according to a predetermined period.

11. A system comprising:
at least one processor in communication with at least one computer readable storage medium having software instructions stored thereon, wherein the software instructions, when executed, cause the at least one processor to perform steps to:
receive an electronic activity verification from an entity;
wherein the electronic activity verification is associated with an electronic activity of a user account verified by an entity;
wherein the electronic activity verification comprises a verified value indicative of a value associated with the electronic activity;
access an electronic activity history, the electronic activity history comprising:
a plurality of electronic activity requests indicative of a plurality of initializations of electronic activities pending approval by the user, and
a plurality of electronic activity verifications indicative of a plurality of user verifications of the electronic activities upon approval by the user of the plurality of electronic activity requests;
filter the plurality of electronic activity requests in the electronic activity history by a predetermined time period associated with the electronic activity verification to identify at least one candidate electronic activity request;
utilize at least one similarity measure to determine a similarity between the at least one candidate electronic activity request and the electronic activity verification;
determine a particular electronic activity request of the at least one candidate electronic activity request based at least in part on the at least one similarity measure and a similarity threshold value;
determine a user-specified value indicative of an additional value specified by a user for the electronic activity based at least in part on a difference between the particular electronic activity request and the electronic activity verification;
encode the verified value and the user-specified value into a feature vector;
input the feature vector into an anomalous attribute classification machine learning model to output an anomaly classification, wherein the anomalous attribute classification machine learning model comprises a plurality of trained machine learning model parameters trained to predict a likelihood of user dispute of the verified electronic activity based on training data comprising:
a history of verified electronic activities and
a history of disputed electronic activities;
wherein the anomaly classification comprises one of:
i) an anomalous user-specified value classification, or
ii) a non-anomalous user-specified value classification;
generate a dispute graphical user interface (GUI) comprising an alert message and a dispute interface element;
wherein the alert message represents the anomalous user-specified value classification of an incorrect user-specified value of the electronic activity verification;
wherein the dispute interface element comprises a user selectable element configured to enable a user to perform a user selection to dispute the electronic activity or accept the electronic activity, wherein the user selection to dispute the electronic activity causes an electronic request to dispute the electronic activity verification to prevent an execution of the electronic activity;
causing to display, by the at least one processor, the dispute GUI on a user computing device associated with the user
receive a user selection of the user selectable element;
wherein the user selection causes the at least one processor to:
determine a classification error of the anomalous attribute classification machine learning model based on the anomaly classification and the user selection; and
retrain the plurality of trained machine learning model parameters of the anomalous attribute classification machine learning model based at least in part on the error to improve accuracy of the anomaly classification for the user, and input, into the anomalous attribute classification machine learning model, a subsequent feature vector of a subsequent electronic activity verification to output a subsequent anomaly classification based at least in part on the plurality of trained machine learning model parameters having been retrained based on the user selection.

\* \* \* \* \*